United States Patent
Gupta et al.

(10) Patent No.: US 9,615,124 B1
(45) Date of Patent: Apr. 4, 2017

(54) METHODS AND SYSTEMS FOR ENHANCING MEDIA VIEWING EXPERIENCES

(71) Applicant: Rovi Guides, Inc., Santa Clara, CA (US)

(72) Inventors: Vikram Makam Gupta, Bangalore (IN); Vishwas Sharadanagar Panchaksharaiah, Tumkur District (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/998,113

(22) Filed: Dec. 23, 2015

(51) Int. Cl.
  *H04N 21/45* (2011.01)
  *H04N 21/431* (2011.01)
  *H04N 21/482* (2011.01)
  *H04N 21/475* (2011.01)
  *H04N 21/466* (2011.01)

(52) U.S. Cl.
  CPC ..... *H04N 21/4312* (2013.01); *H04N 21/4532* (2013.01); *H04N 21/4667* (2013.01); *H04N 21/4755* (2013.01); *H04N 21/482* (2013.01)

(58) Field of Classification Search
  None
  See application file for complete search history.

(56) References Cited

U.S. PATENT DOCUMENTS

2015/0058754 A1* 2/2015 Rauh ............... G06F 3/0482 715/753
2015/0143423 A1* 5/2015 Park ............... G06F 3/041 725/40

* cited by examiner

*Primary Examiner* — Pankaj Kumar
*Assistant Examiner* — Charles N Hicks
(74) *Attorney, Agent, or Firm* — Ropes & Gray LLP

(57) ABSTRACT

Methods and systems are described for a media guidance application that enhances the viewing experiences of users consuming media having important content. If a user tries to change a display away from first media to second media, where the first media has important content that will be displayed eminently, the first media having the important content may be displayed in full-screen and the second media may be displayed in a picture-in-picture window overlaid on the first media that continues to be displayed in full-screen. For example, in this manner, a user will not inadvertently change television channels away from a movie or sports game right before an important scene in the movie or an important play in the sports game is displayed.

20 Claims, 10 Drawing Sheets

1100

1100 ...
1101 Initialization Subroutine
1102 ...
1103 //Routine to Begin subroutine to determine whether to change display of a first media asset in full-screen mode to a second media asset in full-screen mode based on a selection of the second media asset
1104
1105 Receive a user profile from memory, wherein the user profile identifies a media characteristic preferred by the user
1106
1107 A = Accessed stored value of the media characteristic of the first media asset
1108 B = Accessed stored value of the media characteristic preferred by the user
1109 C = Time of the selection of the second media asset
1110 D = Accessed frame of the first media asset corresponding to time C
1111
1112     If (A!=B)
1113         Execute subroutine to generate for display, using control circuitry, the second media asset in full-screen mode
1114     Else
1115         Execute subroutine to identify content in a frame D of the first media asset generated for display at time C
1116         If (content is important)
1117             Execute subroutine to prompt the user to confirm the selection and to notify the user that an important content in the first media asset corresponds to the time of the selection
1118             If (User selection is confirmed)
1119                 Execute subroutine to generate for display, using control circuitry, the second media asset in full-screen mode
1120             Else
1121                 Execute subroutine to generate for display, using control circuitry, the second media asset in a partial screen window, wherein the partial screen window overlays the first media asset in the full-screen mode
1122         Else
1123             Execute subroutine to generate for display, using control circuitry, the second media asset in full-screen mode
1124 ...
1125 Termination Subroutine
1126 ...

```
1300 ...
1301 Initialization Subroutine
1302 ...
1303 //Routine to determine whether to change display of a first media asset in full screen
     mode to display of a second media asset in full-screen mode based on a selection of
     the second media asset
1304
1305       Execute subroutine to identify a frame corresponding to the first media asset,
     wherein the frame is generated for display, by control circuitry, at a time
     corresponding to the selection
1306 Determine a position of the frame within the first media asset
1307 Retrieve, from a database, a database entry listing a portion of the first media asset
     having important content
1308
1309
1310 A = Determined value of the position of the frame within the first media asset
1311 B = Identified value of the beginning position within the first media asset
1312 C = Identified value of the ending position within the first media asset
1313
1314
1315       If (!(B<=A<=C))
1316            Execute subroutine to generate for display, using control circuitry, the
     second media asset in full-screen mode
1317       Else
1318            Execute subroutine to prompt the user to confirm selection of the
     second media asset for full-screen display
1319            If (User selection is confirmed)
1320                 Execute subroutine to generate for display, using control
     circuitry, the second media asset in full-screen mode
1321            Else
1322                 Execute subroutine to generate for display, using control
     circuitry, the second media asset in a partial screen window, wherein the partial
     screen window overlays the first media asset in the full-screen mode 1323 ...
1324 Termination Subroutine
1325 ...
```

FIG. 13

METHODS AND SYSTEMS FOR ENHANCING MEDIA VIEWING EXPERIENCES

BACKGROUND

In conventional systems, users have access to a wide variety of media, such as television programs. Oftentimes, a user will switch through media without realizing that an important portion is either currently being displayed or will be displayed in the near future. As a result, the user will miss content that may be important to the user.

SUMMARY

Accordingly, methods and systems are described herein for a media guidance application that enhances media viewing experiences for users viewing media with important content. In particular, the media guidance application may detect important content in media and may continue to display the media until the important content is no longer detected'. For example, the media guidance application may receive a user selection of first media, such as a hockey game. The media guidance application may detect a power play as important content in the media because there is a higher chance of scoring a goal during a power play than during regular play. If the media guidance application receives a request from a user to change to second media (e.g., a baseball game) while a power play is detected in the hockey game, the media guidance application may continue to display the hockey game until the power play is no longer detected. The media guidance application may, in response to the user request, display the hockey game in a full-screen mode and may display the baseball game in a smaller window, overlaid over the hockey game. The media guidance application may change to the baseball game once the power play is finished in the hockey game. Because the media guidance application displays both the media having important content (e.g., the hockey game) and the second media requested by the user (e.g., the baseball game) the user does not end up missing out on important content, thus improving the user's viewing experience.

In some aspects, the media guidance application may receive, from a user input device at a first time, a first selection of a first media asset for display in a full-screen mode. For example, the media guidance application may receive user input from a remote control corresponding to the media guidance application by detecting a remote control signal at a remote control receiver accessible by the media guidance application. The media guidance application may associate receiving the remote control signal with a first time, substantially similar to a time when the remote control signal was received by the media guidance application. The media guidance application may process the remote control signal and may detect a command selecting a first media asset. For example, the media guidance application may detect, in the remote control signal, a command selecting a first television channel for viewing in a full-screen mode.

In some embodiments, in response to receiving the first selection, the media guidance application may generate for display, using control circuitry, the first media asset in the full-screen mode. For example, the media guidance application may detect a channel number in the remote control signal as described above. The media guidance application may access media corresponding to the channel and may generate for display the media in full-screen on a display device accessible to the media guidance application.

In some embodiments, the media guidance application may receive, from the user input device at a second time, a second selection of a second media asset for display in the full-screen mode, wherein the second time is later than the first time. For example, the media guidance application may receive a second remote control signal at a remote control receiver accessible to the media guidance application. The media guidance application may correlate the detection of the second remote control signal with a system time, substantially equal to a time the media guidance application detects the second remote control signal. The media guidance application may determine that the second time is later than the first time (i.e., the media guidance application receives the second selection after receiving the first selection). The media guidance application may determine, based on a command detected in remote control signal, that the second selection is a command to generate a second media asset for display in a full-screen mode. For example, the media guidance application may detect a second command to access a second media asset corresponding to a second channel, different from the first media asset.

In some embodiments, in response to receiving the second selection, the media guidance application may determine, using the control circuitry, whether a portion of the first media asset, generated for display in the full-screen mode at a point within a time window from the second time, includes important content. For example, the media guidance application may receive a frame of a plurality of frames associated with the first media asset and may perform an image processing algorithm on the frame to determine whether the frame comprises content that may be important to the user.

In some embodiments, the media guidance application may determine that an image processing rule corresponds to one of detecting fast action within a frame, identifying text matching a predefined string, and identifying an object having significance to the user.

The media guidance application may select the frame for the processing by identifying a point within a time window from the second selection. For example, the media guidance application may detect the selection at 3:00 PM (e.g., by correlating the system time with the second selection when the second selection is detected by the media guidance application). The media guidance application may retrieve, from a database, a time threshold defining a time window around the second selection. For example, the media guidance application may retrieve a time window of one minute from a database accessible to the media guidance application. In the example, the media guidance application may identify the time window as the time spanning 3:00 PM (e.g., the time of the selection) to 3:01 PM (e.g., one minute from the selection). The media guidance application may identify a frame of the first media asset that is generated for display within the time window. For example, the media guidance application may retrieve a frame of the first media asset that is generated for display within the window and may perform an image processing algorithm on the frame to detect important content in the frame.

In some embodiments, the media guidance application may identify important content as a player in a user's fantasy sports roster, a scene corresponding to high social chatter, or gameplay in a sports event having a high probability of scoring.

In some embodiments, the media guidance application may determine whether the portion of the first media asset comprises important content by retrieving metadata corresponding to the first media asset, wherein the metadata identifies content corresponding to the portion. The media guidance application may retrieve, from a database, a set of data that identifies content types that are important. For example, the media guidance application may retrieve from the database a set listing an important content type, such as "bases loaded" for a baseball game, because, for example, a point is more likely to be scored in baseball when bases are loaded than when bases are not loaded. The media guidance application may compare the content types in the set to content corresponding to the portion to determine if there is a match. For example, the media guidance application may analyze content corresponding to a portion of a baseball game to determine if any "bases loaded" content corresponds to the portion. If the media guidance application determines that a content type from the set (e.g., a bases loaded content type) matches content corresponding to the portion, the media guidance application may determine that the portion is important (e.g., if the media guidance application determines that in the portion of the baseball game, bases are loaded). If the media guidance application determines that content types of the set does not match content corresponding to the portion of the baseball game, the media guidance application may determine that the portion is not important (e.g., if the media guidance application determines that in the portion of the baseball game, bases are not loaded).

In some embodiments, the media guidance application may determine if the portion of the first media asset includes content important to the user based on a user profile. The media guidance application may retrieve a user profile from memory. For example, the media guidance application may access a profile stored in memory listing a user's media preferences and may detect a user's media preference for sports. The media guidance application may retrieve a set of characteristics corresponding to a first media asset, such as a genre characteristic listing a genre for the first media asset.

The media guidance application may compare the user preference (e.g., preference for sports genre) to the characteristic of the first media asset (e.g., the genre of the first media asset) to determine if the portion of the first media asset is important. For example, if the media guidance application determines that the genre of the first media asset is sports and that the user preference is for sports, the media guidance application may determine that the portion of the first media asset is important; because, for example, the user is more likely to find content matching the user preference (e.g., sports) to be more important than content not matching the user preference (e.g., soap operas). Accordingly, if the media guidance application determines that the characteristic of the first media asset does not match the user preference, the media guidance application may determine that the first media asset is not important.

In some embodiments, the media guidance application may determine whether a portion of the first media asset is important based on tagged portions of the first media asset designated as important. For example, the media guidance application may receive metadata corresponding to the first media asset. The media guidance application may parse the metadata to identify an important portion of the first media asset (e.g., an important portion of a movie may be a scene with a famous quote or a scene with a death of an important character).

The media guidance application may determine if the portion of the first media asset matches a time of an important portion listed in the metadata. For example, the media guidance application may determine, based on the metadata, that an important movie scene occurs between 30 minutes and 35 minutes from a beginning of the movie. The media guidance application may determine that the portion of the first media asset begins 40 minutes from the beginning of the movie and ends 42 minutes from the beginning of the movie. Accordingly, since the media guidance application determines that the portion does not overlap with the important scene (e.g., the time period of 30 minutes to 35 minutes does not overlap the time period of 40 minutes to 42 minutes), the media guidance application may determine that the portion is not important. In contrast, if the media guidance application determines that the portion of the first media asset begins 34 minutes from the beginning of the movie and ends 36 minutes from the beginning of the movie, the media guidance application may determine that the portion is important (e.g., because the portion of the first media asset overlaps with the important scene).

In some embodiments, in response to determining that the portion of the first media asset generated for display in the full-screen mode is not important, the media guidance application may generate for display, using the control circuitry, the second media asset in the full-screen mode. For example, the media guidance application may identify a channel number in the second selection as described above. In response to determining that the portion is not important the media guidance application may tune to the second channel and may generate for display the second channel in the full-screen mode (i.e., replacing the first media asset in the full-screen mode). The media guidance application may generate for display the second media asset in the full-screen mode because the user will not miss any important content in the first media asset by changing the channel (e.g., because the media guidance application determined that the portion does not have important content).

In some embodiments, in response to determining that the portion of the first media asset generated for display in the full-screen mode is important, the media guidance application may generate for display, using the control circuitry, the second media asset in a window, wherein the second media asset in the window overlays the first media asset in the full-screen mode. The media guidance application may determine that the portion of the first media asset is important by, for example, performing an image processing algorithm on the first media asset and detecting content in a frame corresponding to the portion. For example, if the first media asset is a baseball game, the media guidance application may analyze the first media asset and determine that the bases are loaded. The media guidance application may identify that "bases loaded" is important content type because, for example, a team playing in the baseball game may have greater probability of scoring when the bases are loaded as opposed to when the bases are not loaded. In response to detecting that the first media asset has importance content, the media guidance application may generate the second media asset for display in a window overlaying the first media asset displayed in the full-screen mode. The media guidance application may generate the second media asset for display in the window so that the user does not miss out on the important content detected in the first media asset and so that the user may also consume the second media asset in accordance with the selection.

In some embodiments, the media guidance application may notify the user when content matching an important content type is detected in the first media asset and may request that the user confirms the second selection. For example, the media guidance application may generate for display a pop-up window notifying the user of the important content and may prompt the user to confirm the second selection. The media guidance application may prompt the user to confirm the selection because the media guidance application may incorrectly predict that the content is important to the user and the user may wish to skip the content deemed important by the media guidance application.

In some embodiments, the media guidance application may buffer at least one of the first and the second media asset in response to receiving the second selection. For example, upon receiving the second selection, the media guidance application may store frames corresponding to the first and the second media asset in a memory until the user confirms the second selection. The media guidance application may buffer at least one of the first and the second media assets to make sure that the user does not miss any important content while the user is responding to a prompt generated by the media guidance application. The media guidance application may generate for display the buffered frames after receiving confirmation of the second selection.

In some embodiments, the media guidance application may identify a position of important content in the full-screen mode and may generate for display, a window or a prompt in a position not having important content (i.e., not blocking the important content). For example, the media guidance application may identify a position of the screen having important content by performing an image processing algorithm on a frame to identify a location of important content. For example, the media guidance application may identify an important content type in a movie as a death of a major character in the movie. The media guidance application performs the image processing algorithm on the frame to identify a location of the character within the full-screen mode and may generate for display at least one of a prompt or a window in a position not overlapping with the location of the character. The media guidance application may generate for display the window or the prompt in an area not having important content so, for example, the user will not miss the important content because of a prompt or because of the window blocking the content.

In some embodiments, the media guidance application may receive a third selection to generate for display the first media asset in the partial screen window. The media guidance application may receive the third selection via a remote control, as described above. In response to the third selection, the media guidance application may generate for display the first media asset in the window mode and may generate for display the second media asset in the full-screen mode, because, for example, the user may want to view the second media asset without missing an important portion of the first media asset.

In some embodiments, the media guidance application may generate for display a description of the important content overlaying the full-screen mode. For example, the media guidance application may receive metadata corresponding to the first media asset containing a description of important content in the portion. The media guidance application may generate for display text describing the portion to the user, because, for example, the user may wish to hear audio of the second media asset instead of audio of the first media asset and does not want to miss the content of the first media asset or, the user may not be able to see all of the important content and may instead desire a verbal or textual presentation of the important content.

In some embodiments, the media guidance application may determine that a second portion of the first media asset is not important, and, in response to determining that the second portion of the first media asset is not important, the media guidance application may generate for display the second media asset in the full-screen mode (i.e., replacing the first media asset in the full-screen mode). For example, the media guidance application may determine that the first media asset is a hockey game. The media guidance application may determine that a second portion of the first media asset corresponds to a commercial break. The media guidance application may determine that the second portion is not important because the commercials do not correspond to the actual hockey game. The media guidance application may generate for display the second media asset in the full-screen mode to replace the first media asset in the full-screen mode. For example, the media guidance application may determine that, because the second portion of the first media asset is not important, the user would prefer the second media asset.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 11 is an illustrative example of code that may be used to determine whether to generate for display a second media asset in full-screen mode based on content recognized in a first media asset in accordance with some embodiments of the disclosure;

FIG. 13 is an illustrative example of code that may be used to determine whether to generate for display a second media asset in full-screen mode based on metadata received about a first media asset in accordance with some embodiments of the disclosure;

DETAILED DESCRIPTION OF DRAWINGS

Figure 1:
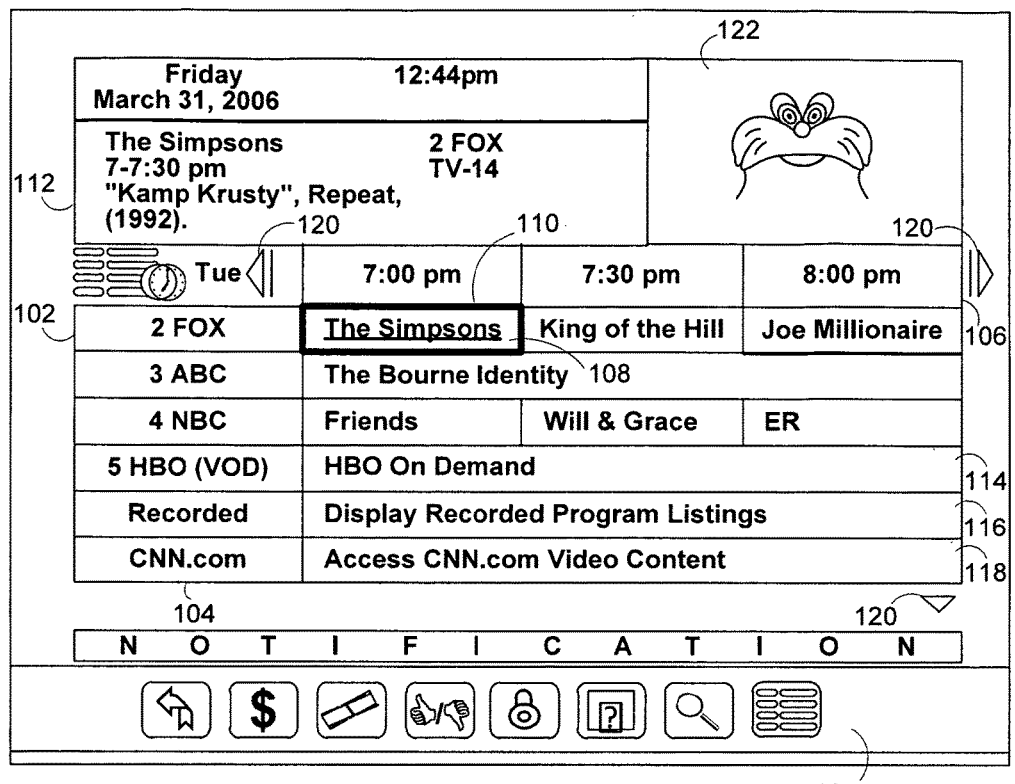
FIG. 1 shows an illustrative example of a media guidance display that may be presented in accordance with some embodiments of the disclosure.

Methods and systems are described herein for a media guidance application that enhances viewing experiences of a user when viewing media having important content. In particular, when content matching an important content type is detected by the media guidance application in a portion of a first media asset, the media guidance application may continue to generate for display the first media asset (e.g., in a full-screen mode) until the content is no longer detected. For example, the media guidance application may receive a first user selection of first media, such as the movie "Titanic." If the media guidance application receives a second user selection of second media (e.g., a baseball game) while the user is still viewing the first media, the media guidance application may determine whether an upcoming or currently displayed portion of the first media has important content; if so, the media guidance application may ensure that the important content is not unintentionally missed by the user.

For example, in response to receiving the second user selection, the media guidance application may analyze the first media asset to determine whether important content is currently being displayed or will be displayed in the near future. For example, the media guidance application may identify a position of important content in the first media, such as the scene when the Titanic hits the iceberg (e.g., because hitting the iceberg is an important event in the movie "Titanic"). The media guidance application may then determine if the user is either currently viewing the scene or if the scene is upcoming. If the media guidance application determines that the scene is less than a threshold time away, the media guidance application may continue to generate the first media (e.g., "Titanic") for display in a full-screen mode and may generate for display the second media (e.g., the baseball game) in a partial screen window, partially overlaid over content being displayed, in this example, "Titanic." Because the media guidance application displays both the media having important content (e.g., the scene of "Titanic") and the second media requested by the user (e.g., the baseball game) the user does not end up missing out on important content or the requested media, thus improving the user's viewing experience. Once the media guidance application determines that the important scene of "Titanic" is complete, the media guidance application may generate for display the baseball game (e.g., the second media) in the full-screen mode, replacing the display of the first media asset.

As referred to herein, "important content" refers to anything in media that may be noteworthy or significant. For example, important content in a hockey game may be a power play, since there is a greater likelihood of scoring during a power play than not. In another example, important content may be a significant plot development in a television show, such as a death of a main character. In another example, important content may be a scene of a movie having high social chatter. In another example, important content in a movie may be an actor saying a famous quote.

Important content may be important relative to a user profile of a user. For example, a user may have a sports player in his or her fantasy sports roster. Important content relative to the user may be the fantasy sports player, when they are actively playing in a real-life sporting event; because, for example, the performance of the player may affect the user's fantasy sports score. In another example, important content may be based on a social media profile of the user. For example, the media guidance application may determine that the user "likes" a celebrity, such as Donald Trump, on a social media profile, such as a Facebook profile. The media guidance application may identify Donald Trump in a portion of a television as important content.

Important content may be crowd sourced. For example, the media guidance application may retrieve data from social media networks to identify important portions in media. For example, the media guidance application may retrieve hash tags related to media or data from a social network, such as Facebook, identifying content that is most shared or discussed on (e.g., Facebook's "most talked about" data). The media guidance application may identify a portion of a media asset corresponding to high social chatter by, for example, determining that many users have shared a clip from a media asset (e.g., based on Facebook's "most talked about" data. The media guidance application may create a fingerprint for the clip and may compare the fingerprint of the clip to a database of fingerprints for media to identify a position in media matching the fingerprint.

As referred to herein, a "portion" of a media asset may refer to any part of a media asset that is distinguishable from another part of the media asset. For example, a portion may correspond to a frame, set of frames, scene, chapter, segment of time, etc. The media guidance application may identify distinct portions based on time-marks (e.g., a portion begins at a first time mark and ends at a second time mark) in the play length of a media asset. Alternatively or additionally, the media guidance application may identify portions based on a range of frames (a portion begins at a first frame and ends at a second frame). Alternatively or additionally, the media guidance application may identify portions based on content in the media asset (a portion may begin at the appearance of particular content and end at the appearance of the same or different content). Alternatively or additionally, the media guidance application may identify portions based on metadata associated with the media asset (a portion may begin at a first metadata tag and end at a second metadata tag.

As referred to herein, a "frame" may be any image associated with media. For example, a frame of a movie may be an image captured at a specific point in the movie. The media guidance application may perform image processing on a frame of media to determine if there is important content in the media.

As referred to herein, a "full-screen mode" may be a way of generating for display media such that it takes up all space allocated for media display on a display device. For example, the media guidance application may receive an allocation of a set of pixels, less than all pixels, of a display device. In this example, a full-screen mode may comprise all pixels allocated in the set. In another example, a full-screen mode may comprise all pixels of a display device. In another example, the media guidance application may be connected to multiple display devices. In this example, a full-screen mode may comprise all pixels of a single display device or may comprise all pixels of each of the display devices.

As referred herein, the term "in response to" refers to initiated as a result of. For example, a first action being performed in response to a second action may include interstitial steps between the first action and the second action.

As referred herein, the term "directly in response to" refers to caused by. For example, a first action being performed directly in response to a second action may not include interstitial steps between the first action and the second action.

As referred to herein, a "media guidance application" is any program that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 2:
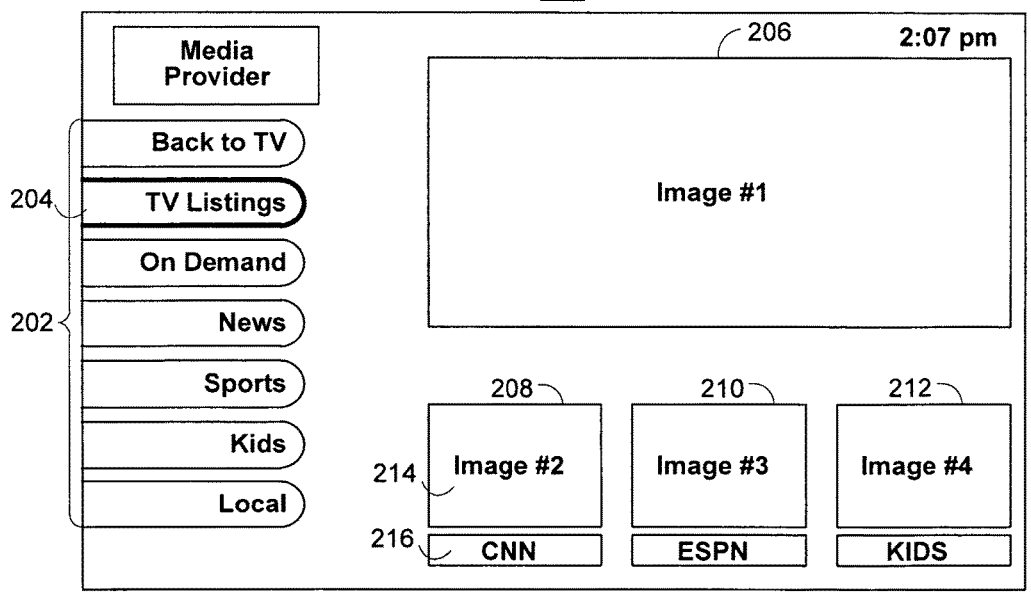
FIG. 2 shows another illustrative example of a media guidance display that may be presented in accordance with some embodiments of the disclosure.

In some embodiments, the media guidance application may detect user selection of a media asset though user interaction with an element of the illustrative display screens depicted in FIGS. 1-2. FIGS. 1-2 show illustrative display screens that may be used to provide media guidance data. The display screens shown in FIGS. 1-2 may be implemented on any suitable user equipment device or platform. While the displays of FIGS. 1-2 are illustrated as full-screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 124. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 124 may allow the user to access different types of content, media guidance application displays, and/or media guidance application features. Options region 124 may be part of display 100 (and other display screens described herein), or may be invoked by a user by selecting an on-screen option or pressing a dedicated or assignable button on a user input device. The selectable options within options region 124 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
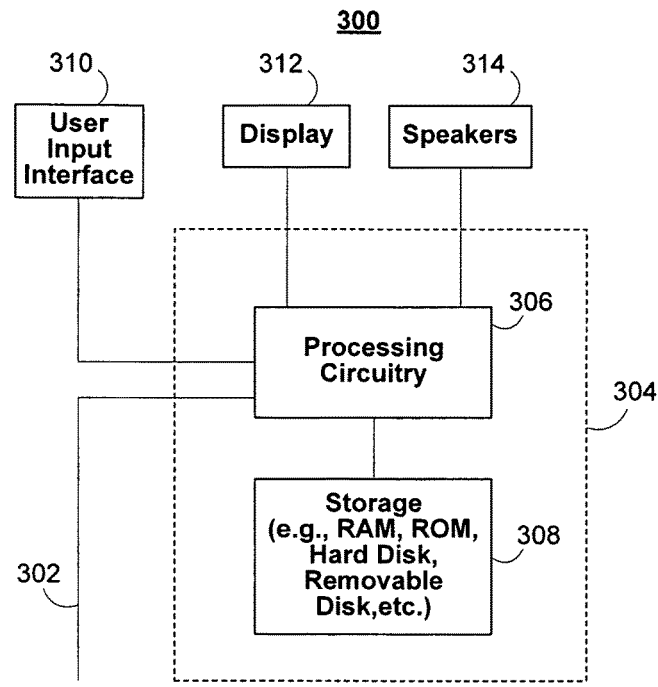
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
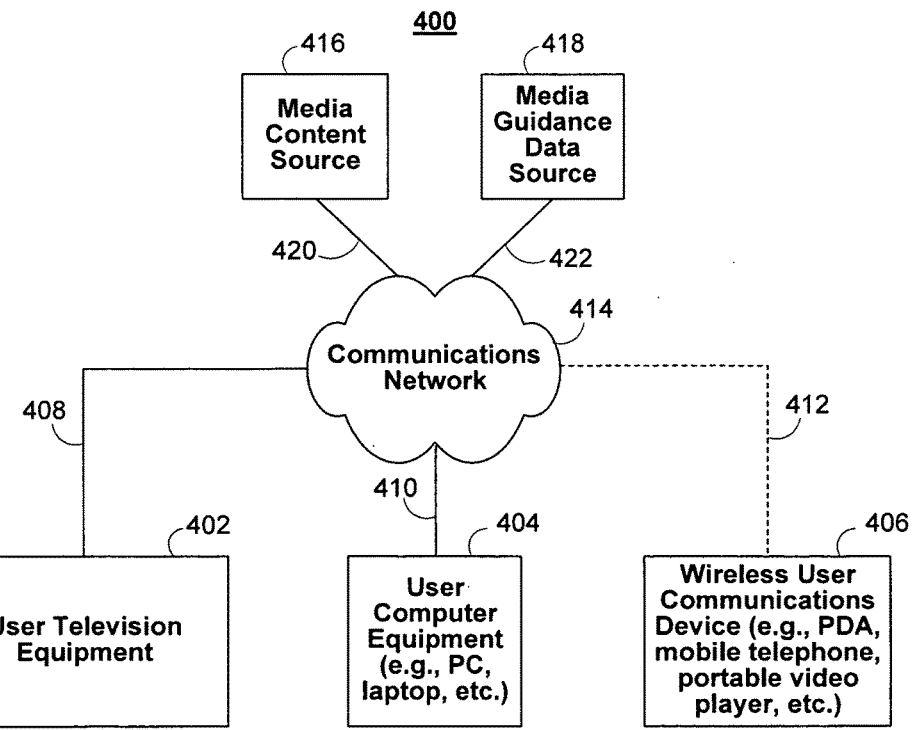
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry (e.g., control circuitry 304) may receive, from a user input device (e.g., user input interface 310) a selection of a first media asset for display in a full-screen mode (e.g., for display on display 312) at a first time. In response to receiving the first selection, control circuitry 304 may generate for display, using control circuitry 304, the first media asset in the full-screen mode (e.g., on display 312. Control circuitry 304 may receive from the user input device (e.g., user input interface 310) a second selection of a second media asset for displaying (e.g., on display 312) in the full-screen mode at a second time. In response to receiving the second selection (e.g., via user input interface 310), control circuitry 304 may determine whether a portion of the first media asset, generated for display in the full-screen mode (e.g., for display on display 312) includes important content. Control circuitry 304 may identify the portion at a point within a time window for the second time (e.g., at most a threshold of time away from the second time). In response to determining that the portion of the first media asset is not important, control circuitry 304 may generate for display (e.g., for display on display 312) the second media asset in the full-screen mode. In response to determining that the portion of the first media asset generated for display in the full-screen mode is important, control circuitry 304 may generate for display (e.g., for display on display 312) the second media asset in a window, wherein the second media asset in the window overlays the first media asset in the full-screen mode.

Figure 5:
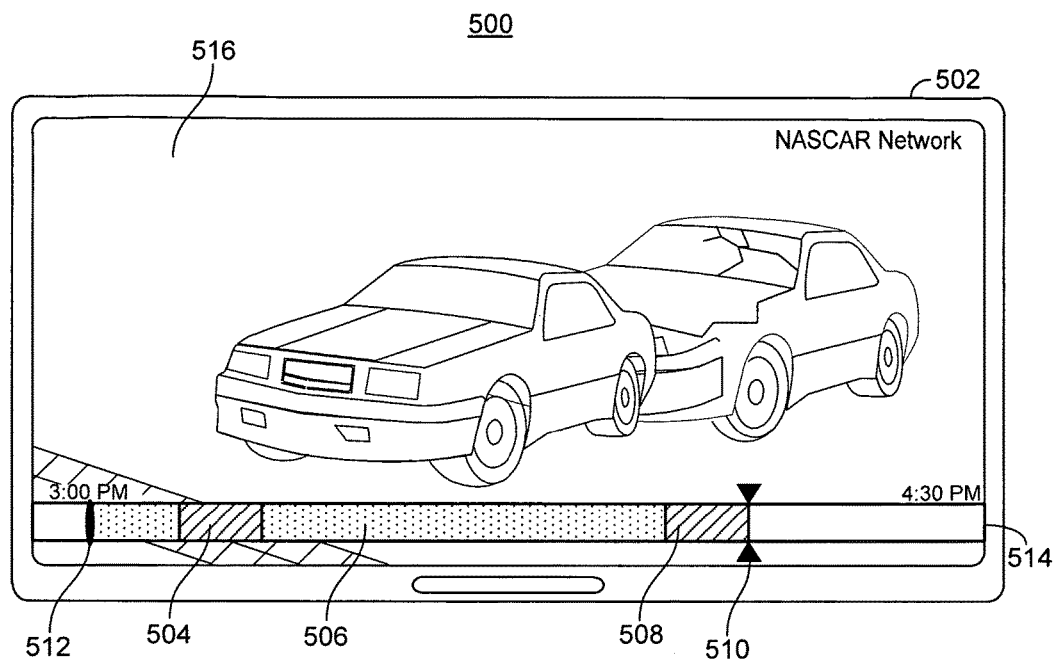
FIG. 5 shows an illustrative example of a first media asset generated for display in a full-screen mode in accordance with some embodiments of the disclosure.

FIG. 5 shows an illustrative embodiment of a first media asset generated for display by control circuitry 304 in a full-screen mode in accordance with some embodiments of the disclosure. User equipment 500 is depicted as a television 502 but may be any user equipment device comprising a display, such as user television equipment 402, user computer equipment 404, or wireless user communications interface 406. Control circuitry 304 may be coupled to the display (e.g., display 312) of user equipment 500 as depicted in FIG. 3 described above. Control circuitry 304 may generate for display full-screen first media asset 516 for display on television 502. The control circuitry 304 may also generate for display progress bar 514 comprising first important portion 504, buffered portion 506 and second important portion 508. Control circuitry 304 may designate a time when a user first requested a media asset using beginning marker 512. Control circuitry 304 may generate for display progress indicator 510 indicating a position within the first media asset corresponding to full-screen first media asset 516.

In some aspects, the control circuitry 304 may receive, from a user input device, such as user input interface 310, at a first time, a first selection of a first media asset for display in a full-screen mode. For example, control circuitry 304 may receive input via a user input interface 310 such as an infrared detector, Radio Frequency RF receiver, Bluetooth receiver, Wi-Fi receiver, touch screen digitizer, etc. Control circuitry 304 may detect a packet at a Bluetooth receiver comprising a first selection of a first media asset. For example, control circuitry 304 may parse the Bluetooth packet to identify a data portion of the packet comprising a movie (e.g., a first media asset such as "The Godfather") selected by the user for viewing in the full-screen mode. Upon detection of the first selection (e.g., the Bluetooth packet) control circuitry 304 may access a first time, such as a system time, a global time, a time relative to just control circuitry 304, etc., and control circuitry 304 may associate the selection with the time (e.g., by storing data in memory, such as storage 308, correlating the selection with the first time) to record a relative ordering for the selection. Control circuitry 304 may mark the first time in progress bar 514 by designing the first time with a marking, such as beginning marker 512.

In some embodiments, in response to receiving the first selection, control circuitry 304 may generate for display (e.g., for display on display 312), the first media asset in the full-screen mode. For example, control circuitry 304 may detect a first media asset (e.g., a race on NASCAR Network) in a Wi-Fi packet received by control circuitry 304 via communications network 414 or via user input interface 310. Control circuitry 304 may retrieve the first media asset to generate the first media asset for display on television 502. For example, control circuitry 304 may retrieve the program available from a channel NASCAR Network by, for example, querying media guidance data source 418 via communications network 414 for a frequency corresponding to NASCAR Network.

In another example, control circuitry 304 may identify the channel by cross-referencing NASCAR Network with a channel map stored in memory of control circuitry 304 such as storage 308. Control circuitry 304 may tune to the frequency using a television tuner accessible to control circuitry 304. In another example, control circuitry 304 may determine that the first media asset is available via a video-on-demand channel for NASCAR Network. Control circuitry 304 may access a database having a plurality of video-on-demand media, such as media content source 416, to retrieve the first media asset. In another example, control circuitry 304 may stream the first media asset from a third-party provider, such as a streaming provider having content stored at media content source 416. In another example, control circuitry 304 may stream media in a packet switched network such as an IPTV network. The media guidance application may generate a plurality of packets to the third-party provider via communications network 414 to establish a streaming session to retrieve the first media asset. In another example, control circuitry 304 may retrieve the first media asset from a memory, such as storage 308. Once control circuitry 304 retrieves the first media asset, control circuitry 304 may generate the first media asset for display in a full-screen mode, as depicted in full-screen first media asset 516.

In an example, control circuitry 304 may communicate with a display 312 to identify a screen size (e.g., a size measured in pixels) associated with a display device, such as television 502. Control circuitry 304 may scale the first media asset so that the first media asset is generated for display using all of the pixels of the display device. In another example, control circuitry 304 may receive a screen size (e.g., a size in pixels) associated with the display device having less than all of the pixels of the display device (e.g., because the rest of the pixels of the display device may be allocated for displaying a guide or other content). Control circuitry 304 may scale the first media asset so that it comprises all of the pixels of the received screen size.

In some embodiments, control circuitry 304 may receive, from the user input interface 310 at a second time, a second selection of a second media asset for display (e.g., for display on display 312) in the full-screen mode, wherein the second time is later than the first time. For example, control circuitry 304 may receive a second selection via a touch screen (e.g., a digitizer at user input interface 310 for receiving touch commands from a user). Control circuitry 304 may detect touch commands at the digitizer and may interpret coordinates corresponding to the digitizer input. For example, control circuitry 304 may correlate the interpreted coordinates with a program listing, such as program listing 108, in a program listing display, such as program listing display 100. Control circuitry 304 may identify a second media asset associated with the program listing, requested for display in the full-screen mode. Upon detecting the touch command (e.g., via user input interface 310), control circuitry 304 may correlate the second selection with a time, as described above, and may store in a data structure in memory (e.g., storage 308) data associating the selection with the time to keep track of an overall ordering of the selections.

Control circuitry 304 may correlate the detection of the touch command with a system time (e.g., a time substantially equal to a time of the detection of the second selection). Control circuitry 304 may determine that the second time is later than the first time by comparing the stored entry of the first time with the stored entry of the second time (i.e., control circuitry 304 received the second selection after receiving the first selection). Control circuitry 304 may determine, for example, based on a identified location corresponding to the touch command, that the second selection is a command to generate a second media asset for display (e.g., on display 312) in a full-screen mode. For example, the media guidance application may detect a second command to change from a first media asset corresponding to NAS-CAR Network to a second media asset corresponding to SOAP Network.

In some embodiments, in response to receiving the second selection, control circuitry 304 may determine whether a portion of the first media asset, generated for display in the full-screen mode at a point within a time window from the second time (e.g., full-screen first media asset 516), includes important content. For example, control circuitry 304 may receive, (e.g., via communications network 414 data from media guidance data source 418) a frame of a plurality of frames associated with the first media asset (e.g., corresponding to the portion) and may perform an image processing algorithm on the frame to determine whether the frame comprises content that is important.

As an example, control circuitry 304 may select the frame by identifying a point within a time window from the second selection. For example, control circuitry 304 may retrieve a stored threshold defining the time window from storage 308 or from a remote database such as media guidance data source 418 via communications network 414. The threshold may either be predefined (e.g., set by a user and stored in a user profile, or set by a content provider to a default value) or may be computed by control circuitry 304. For example, control circuitry 304 may compute a threshold based on a characteristic of a media asset, such as a media asset length, because, for example, a user may have a greater propensity to wait longer for an important scene in a two-hour movie than for a 20 minute television show. Once the threshold is determined by control circuitry 304, control circuitry 304 may compute the time window. Control circuitry 304 may compute the time window as the time spanning any of the exemplary intervals listed below:

S=second time
T=threshold $$\{x|S-t<x\leq S+t\} \quad 1)$$

$$\{x|S\leq x\leq S+t\} \quad 2)$$

$$\{x|S-t\leq x<S\} \quad 3)$$

For example, control circuitry 304 may detect the selection, using user input interface 310 at 4:00 PM (e.g., by correlating the system time with the second selection when the second selection is detected by control circuitry 304). In an example, the second time may be represented by progress indicator 510, because the second selection may be detected by control circuitry 304 when a frame of the first media asset corresponding to full-screen first media asset 516 is generated for display (e.g., by control circuitry 304). In an example, control circuitry 304 may retrieve a threshold of one minute from a database, such as media guidance data source 418, via communications network 414. In the example, control circuitry 304 may identify the time window as the time spanning 4:00 PM to 4:01 PM. Control circuitry 304 may identify a frame of the first media asset that is generated for display (e.g., generated for display by control circuitry 304 for display on display 312) within the time window. For example, control circuitry 304 may retrieve a sequence of frames of the first media asset (e.g., by retrieving frames via communications network 414 from media content source 416) corresponding to full-screen first media asset 516 and may perform an image processing algorithm on the frame to detect important content in the frame.

In an example, the control circuitry 304 may run an image processing algorithm, such as an object detection algorithm on the frame, to determine if the frame comprises important content. For example, the (media guidance application may perform edge detection within a particular frame and, based on the results, detect contours of various objects within the frame. For example, control circuitry 304 may perform a search-based or a zero-crossing based edge detection method on a frame of the media. Control circuitry 304 may approximate a first derivative of pixel data corresponding to the frame to derive a gradient for the image (e.g., by convolving the image with a kernel, such as a Sobel operator). Based on the gradient, control circuitry 304 may identify local minima or maxima in the gradient. Control circuitry 304 may suppress all pixels not identified as a local minima or maxima and may apply thresholding or hysteresis to filter the output.

When edge detection is complete, control circuitry 304 may extract an object discovered during edge detection. For example, control circuitry 304 may create a fingerprint for objects in the frame based on the edge detection algorithm as described above. Control circuitry 304 may compare the fingerprint for the frame to an object database that stores object fingerprints that are known and have been categorized into known objects. The object database may also store descriptions of the objects contained within the object database. When control circuitry 304 detects a particular object in a frame, the control circuitry 304 may retrieve keywords describing the object from the object database.

In some embodiments, control circuitry 304 may perform an image processing algorithm to detect characters in a media asset. For example, control circuitry 304 may perform an optical character recognition ("OCR") algorithm to detect characters in the media asset and may generate a set of string coordinate pairs corresponding to the text in the media asset. For example, control circuitry 304 may retrieve a frame of a media asset, such as a financial news broadcast. Control circuitry 304 may detect text in a news ticker at a bottom of the frame of the media asset (e.g., by performing the object detection procedures as described above). Control circuitry 304 may generate a string matching the string in the news ticker by performing the OCR algorithm on the frame. Control circuitry 304 may associate the string with a position of the original string in the frame (e.g., the bottom of the frame).

In some embodiments, control circuitry 304 may analyze a frame to determine whether a characteristic of the frame matches an image processing rule. For example, control circuitry 304 may determine that the frame corresponds to a live sporting event, such as a football game (e.g., by retrieving metadata corresponding to the first media asset from media guidance data source 418, by detecting an object, such as a football in the frame, or by detecting football team names in a scoreboard). In an example, control circuitry 304 may analyze the frame by performing an image processing algorithm, as described above, to identify objects in the frame, such as a football, and to identify text corresponding to yard markers on the field (e.g., markers noting a location on a football field). Control circuitry 304 may correlate a position of the football within the frame with a position of the text corresponding to the yard markers on the frame to determine a location of the football on the football field.

Control circuitry 304 may retrieve an image processing rule stored locally, such as storage 308, or remotely, such as media guidance data source 418. The image processing rule may define a characteristic having importance. For example, control circuitry 304 may retrieve an image processing rule defining a portion of a football game as important when it is detected that an object, such as a football is less than 20 yard from an end zone, because there is a higher probability of scoring when the football is close to an end zone.

In some embodiments, control circuitry 304 may generate an image processing rule identifying an object having significance to the user, based on a user profile. For example, control circuitry 304 may determine, based on the user profile, that a user participates in a fantasy sports contest. Control circuitry 304 may retrieve, from the user profile, data identifying a user's fantasy sports roster. Control circuitry 304 may generate image processing rules based on the roster. For example, control circuitry 304 may create an image processing rule defining a characteristic of a frame (e.g., a jersey number of a player in the frame, facial recognition of a player in the frame) matching a player in the roster as objects having significance to the user. In another example, control circuitry 304 may create an image processing rule based on recognized text within a frame (e.g., via an ORC image processing algorithm). For example, control circuitry 304 may identify an overlay having text describing a player (e.g., when a player goes up to bat in a baseball game). In another example, control circuitry 304 may determine that the image processing rule identifies a player in a sports event as important because, based on the user profile, control circuitry 304 determines that it is a user's favorite player.

In some embodiments, the image processing rule may correspond to one of detecting fast action within a frame. For example, control circuitry 304 may retrieve a set of frames corresponding to a portion of a media asset. Control circuitry 304 may detect an object in a frame of the set of frames, as described above and may track motion of the object using an accelerated motion vector processing by detecting a position of the object in each frame of the set of frames. If the motion of the object is determined by control circuitry 304 to be greater than a threshold value, control circuitry 304 may associate the portion with a fast motion characteristic.

Control circuitry 304 may compare the characteristic of the frame (e.g., identified objects, recognized text, etc.) to an image processing rule to determine whether the object is important. Control circuitry 304 may determine that the portion of the first media asset includes important content when the characteristic of the frame matches the image processing rule. For example, if control circuitry 304 determines that the portion comprises a player in a user's fantasy sports roster, it is likely that the portion is important to the user. In contrast, control circuitry 304 may determine that the portion of the first media asset does not include important content when the characteristic of the frame does not match the image processing rule because, for example, if the image processing rule is not met, the user may not find the content to be important.

In some embodiments, control circuitry 304 may determine that a portion of a first media asset is important by performing sound processing algorithm on audio corresponding to a portion. For example, control circuitry 304 may retrieve audio corresponding to a portion of a media asset. Control circuitry 304 may compute a fingerprint for the audio and may compare the fingerprint to a database listing fingerprints of important audio segments. In another example, control circuitry 304 may convert audio to text (e.g., via a speech to text algorithm). Control circuitry 304 may compare text of the audio to a database listing important text (e.g., the database may list "Amber Alert" as important text). Control circuitry 304 may determine that the portion of the first media asset is important if it matches text in the database.

In some embodiments, control circuitry 304 may determine whether the portion of the first media asset comprises important content by retrieving metadata corresponding to the first media asset wherein the metadata identifies content corresponding to the portion (e.g., retrieving metadata stored locally on storage 308 or remotely via communications network 414 on media guidance data source 418). Control circuitry 304 may retrieve, from a database (e.g., locally database on storage 308 or remote database on media guidance data source 418 via communications network 414), a set listing content that is important.

For example, control circuitry 304 may retrieve from the database data listing a "crash" for a NASCAR race as an important content type, because, for example, a user may be worried about the well-being of a driver. Control circuitry 304 may compare content in the set to content corresponding to the portion to determine if there is a match. For example, control circuitry 304 may parse the metadata and may identify a plurality of content corresponding to the portion. For example, in relation to full-screen first media asset 516, control circuitry 304 may identify content such as NASCAR, finish line, car, car crash, etc. in the portion of the first media asset. Control circuitry 304 may compare the plurality of content corresponding to the portion (e.g, as described above) to the set to determine if there is a match. In this example, control circuitry 304 may determine that the content in the portion "car crash" matches an important content type listed in the set, "crash." In response to determining that the content corresponding to the first media asset matches important content type from the set, control circuitry 304 may determine that the portion of the first media asset is important. Alternatively, if control circuitry 304 determines that the content corresponding the first media asset does not match an important content type of the set (e.g., if "crash" was not listed as important content type), control circuitry 304 may determine that the portion of the first media asset is not important.

In some embodiments, control circuitry 304 may determine whether the portion of the first media asset includes content important to the user based on a user profile. Control circuitry 304 may retrieve a user profile from memory. For example control circuitry 304 may determine whether a user profile exists by first identifying the user (e.g., login information, a picture of the user (e.g., gained through a webcam), a hash value uniquely identifying the user or any other known identifying information of the user), and then by cross-referencing the user's identity against entries of a user profile database. As a result of the cross-referencing, control circuitry 304 may receive a pointer to a profile if one is located or may receive a NULL value if the profile does not exist. The user profile database may be located remote or local to control circuitry 304 (e.g., on storage 308 or on media guidance data source 418 accessed via communications network 414). If a user profile is located, control circuitry 304 may access database entries corresponding to media characteristics of interest to the user. In some embodiments, control circuitry 304 may store, in the user profile, data automatically generated through use of a media guidance application running on control circuitry 304, such as data indicating media assets previously viewed by the user or may store data explicitly provided by a user such as an age, gender, etc. For example, control circuitry 304 may store a value uniquely identifying a media asset consumed by a user in the profile of the user.

In some embodiments, control circuitry 304 may analyze the user profile data to identify a user preference from the user profile, wherein the user preference identifies a media characteristic of interest to the user. For example, control circuitry 304 may analyze the listing of media previously viewed by the user based on genre. Control circuitry 304 may enumerate the genres corresponding to each entry in the list to identify a genre most viewed by the user. Alternatively, control circuitry 304 may access user profile data provided by a user which explicitly details the user's preferences. For example, control circuitry 304 may determine that the user has already provided a listing of preferred media. In an example, control circuitry 304 determine that a user has a preference for sports by determining that a listing of favorite channels manually entered by the user comprises only sports channels.

In some embodiments, control circuitry 304 may filter a set of important content types received by control circuitry 304 based on a user profile. For example, control circuitry 304 may retrieve, from the user profile, a preference corresponding to a user's favorite singer in a song contest, such as "Eurovision." Control circuitry 304 may retrieve a set of important content types identifying each of the singers in the content as important. Control circuitry 304 may compare each of the singers to the singer identified in the user profile to determine if the content type is important to the user (e.g., the content type matches user profile data). If the content type is not important to the user, control circuitry 304 may ignore the content type.

In some embodiments, control circuitry 304 may retrieve metadata corresponding to the first media asset, wherein the metadata comprises a set of media characteristics corresponding to a first media asset. For example, control circuitry 304 may retrieve metadata stored locally or remotely to control circuitry 304 (e.g., storage 308 or media guidance data source 418 accessed via communications network 414). Control circuitry 304 may parse the metadata to identify characteristics corresponding to the first media asset. Control circuitry 304 may compare the metadata to user preferences to determine if the user would generally find the media to be important. For example, control circuitry may detect that a user has a strong dislike for cooking shows. Control circuitry 304 may therefore determine that the user may not find any portion of any cooking show important. In another example, control circuitry 304 may determine that the user has a very strong preference for football (e.g., all football games are important to the user). Control circuitry 304 may therefore determine that a portion of a football game that simply shows the user's favorite team on the offensive is important to the user, even if at that moment there is activity that would otherwise be regarded as not important.

In some embodiments, the metadata describing the genre of the media content (e.g., football versus cooking) may be compared to the user's profile and additionally the content of the relevant portion of the media may be utilized in making the determination as to whether a portion of the media content is important to the user. For example, for a user with a very strong preference for football, control circuitry 304 may determine that a play at the fifty yard line is important to the user, even if there is a low probability for a touchdown at that moment (for example, the play may be determined to be important if the user's favorite team is on the offensive during that play). Conversely, for a user with only a medium preference for football, control circuitry 304 may determine that the play at the fifty yard line is not important to the user, but a play within a couple yards of the end zone, which would have a higher probability for a touchdown as compared to the play at the fifty yard line, is important to the user with a medium preference for football.

For example, control circuitry 304 may weight an importance of a preference on a 1-5 scale. Control circuitry 304 may, for example, analyze media previously viewed by a user and may enumerate a number of media assets matching each genre associated with a media asset. Control circuitry 304 may rank the genres based on the number of media assets matching the genre (e.g., to determine which genre a user had previously viewed the most). Control circuitry 304 may associated a 1-5 weight to each of the top five most viewed genres. For example, if the first user's third most viewed genre is sports, control circuitry 304 may assign a weight of two to the sports category for the user. In another example, if a second user's most viewed genre is sports, control circuitry 304 may assign a weight of five to the sports category for the user.

In some embodiments, control circuitry 304 may use a weight of a user preference to determine whether a portion of the first media asset is important. For example, control circuitry 304 may determine that a portion of a first media asset corresponds to a passing play 50 yards away from an end zone (e.g., a play having low probability of scoring). Control circuitry 304 may retrieve an importance or weight corresponding to the play. For example, control circuitry 304 may determine that a passing play 50 yards away from an end zone (e.g., a content type) has a weight of two by cross referencing "50 yard passing play" with a database listing content type weight pairs. In another example, the media guidance application may determine a weight for the content type based on a user profile. For example, control circuitry 304 may determine that a user is only interested in rushing plays in a football game. Accordingly, control circuitry 304 may compute a low weight for the content type if the play is a passing play but may compute a high weight for the content type if the play is a rushing play.

Control circuitry may, for example compute an importance of the portion as the weight of the portion multiplied by the weight of the user preference. For example, control circuitry 304 may determine that the weight of the sports preference for a first user is two. Control circuitry 304 may determine that the weight of the portion for the first user is four (e.g., the weight of the preference multiplied by the weight of the content type). Control circuitry 304 may retrieve a threshold value (e.g., from memory) for determining whether the portion is important. For example, control circuitry 304 may retrieve a threshold of five from a memory (e.g., a database remote from control circuitry 304). Control circuitry 304 may compare the threshold to the weight of the portion for the first user and may determine since the weight of the portion is less than the threshold that the portion is not important to the user.

In another example, control circuitry 304 may retrieve a weight of a preference for sports of 5 for a second user. Control circuitry 304 may multiply the weight of the preference (e.g., five) by the weight of the content type (e.g., two) and may determine that the result is above the threshold (e.g., five). In response to the determination, control circuitry 304 may determine that the portion is important to the second user (e.g., but not the first user).

For example, the media guidance application may analyze header fields of the metadata to identify a header field identifying a set of media characteristics corresponding to the first media asset. Alternatively, control circuitry 304 may build a set of media characteristics corresponding to the first media asset based on the metadata. For example, control circuitry 304 may detect media characteristics in the metadata, such as a genre, runtime, leading actor/actress, etc. Control circuitry 304 may store each of the media characteristics in a data structure in memory (e.g., storage 308) for later comparison.

In some embodiments, control circuitry 304 may determine whether the portion of the first media asset is important based on metadata identifying important portions of the first media asset. For example, control circuitry 304 may detect, in the metadata identifying an important portion with a beginning delimited by a first position in the first media asset and an ending delimited by a second position in the first media asset. Details of the structure of the metadata are discussed further in relation to FIG. 15.

Control circuitry 304 may parse the metadata to identify important portions of the first media asset (e.g., by identifying the first position and the second position corresponding to the first media asset). Control circuitry 304 may compare the portion of the first media asset with the portions identified in the metadata to determine if there is any overlap. For example, control circuitry 304 may determine, based on the metadata, that an important movie scene occurs between 30 minutes from a beginning of the movie and 35 minutes from a beginning of the movie. Control circuitry 304 may determine that the portion spans 40 minutes from the beginning of the movie to 42 minutes from the beginning of the movie (e.g., based on the time window as described above). Accordingly, because control circuitry 304 determines that the portion does not overlap with the important scene, control circuitry 304 may determine that the portion is not important. In contrast, if control circuitry 304 determines that the portion spans the times of 34 minutes to 36 minutes, control circuitry 304 may determine that the portion is important (e.g., because the portion includes an important scene of the first media asset).

In some embodiments, control circuitry 304 may generate for display a visual indication of an important portion to the user. For example, control circuitry 304 may generate for display a visual indication of an important portion of a media asset in a timeline corresponding to the media (e.g., so that a user can quickly jump to important portions or know when an important portion is upcoming). For example, control circuitry 304 may retrieve metadata corresponding to a media asset listing important portions of the media as described above. Control circuitry 304 may correlate the important portions with portions of a timeline corresponding to the media to identify frames of the media corresponding to the important portion. Based on the correlation, control circuitry 304 may generate a progress indicator, such as progress bar 514. Control circuitry 304 may visually distinguish important portions of the media in the progress bar (e.g., progress bar 514) from portions of the media that are not by, for example, shading and/or coloring the regions of the timeline corresponding to important portions differently than regions of the timeline corresponding to all other portions. For example, control circuitry may display important portions such as first important portion 504 and second important portion 508 in shading different than buffered portion 506, since control circuitry 304 may have determined that buffered portion 506 is not important.

In some embodiments, in response to determining that the portion of the first media asset generated for display in the full-screen mode is not important, control circuitry 304 may generate for display (e.g., on display 312) the second media asset in the full-screen mode. For example, control circuitry 304 may identify that the portion of the first media asset is not important as described above. In response to determining that the portion is not important, the media guidance application may identify a location of the second media asset (e.g., locate a channel corresponding to the second media asset as described above) and may generate for display the second media asset in the full-screen mode (i.e., replacing the first media asset in the full-screen mode). The media guidance application may generate for display the second media asset in the full-screen mode because the user will not miss any important content in the first media asset by changing to the second media asset (e.g., because the media guidance application determined that the portion does not have important content).

Figure 6:
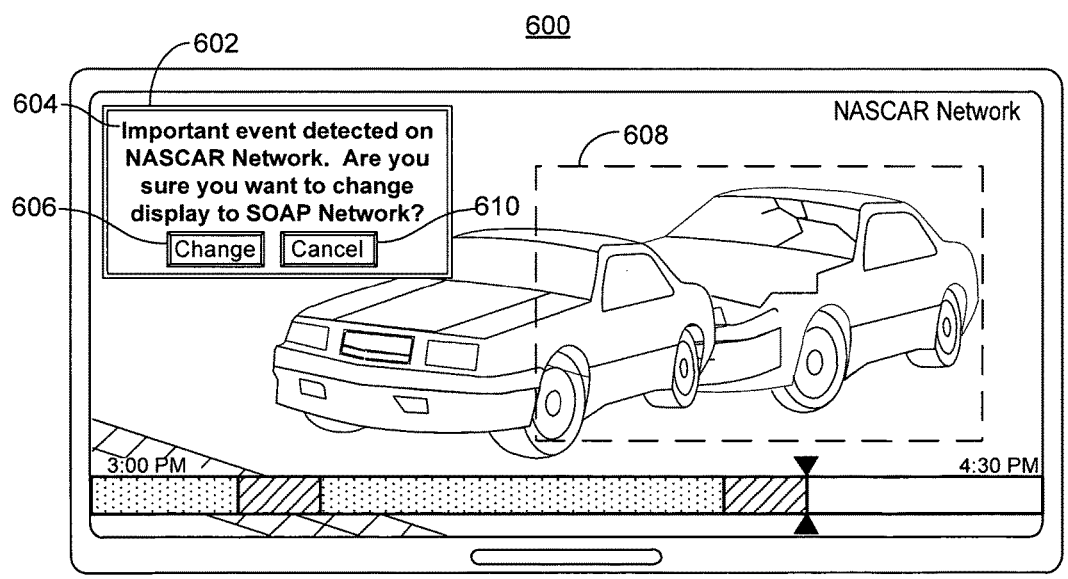
FIG. 6 shows an illustrative example of a prompt to confirm selection of a second media asset, not blocking important content in a first media asset accordance with some embodiments of the disclosure.

FIG. 6 shows an illustrative example of a prompt to confirm selection of a second media asset, generated by control circuitry 304 away from important content in accordance with some embodiments of the disclosure. User equipment 600 is depicted having prompt 602 (e.g., generated for display by control circuitry 304) prompting a user to confirm selection of the second media asset. Control circuitry 304 may generate for display a prompt message 604 describing a reason for not automatically proceeding with the selection (e.g., because the user will miss important content if display is changed to a second media asset). Control circuitry 304 may generate for display change button 606, and cancel button 610 to allow the user to confirm their selection. Important content area 608 may depict a region of a display as having content, as determined by control circuitry 304, that is important.

In some embodiments, control circuitry 304 may generate for display a prompt 602 in response to determining that the portion of the first media asset has important content. For example, control circuitry 304 may generate for display a message in the prompt (e.g., prompt 602) to inform the user about the important content in the first media asset (e.g., via prompt message 604). For example, control circuitry 304 may generate for display a description of the important content (e.g., by identifying the important content via image processing or by receiving metadata describing the important content as described above). Control circuitry 304 may also generate for display a time when the important content will be generated for display. For example, the media guidance application may determine that important content begins at a time 30 minutes from the beginning of the first media asset. Control circuitry 304 may determine that a current position in the first media asset (e.g., position corresponding to progress indicator 510) is 25 minutes from the beginning of the first media asset and may subtract the time when the important content begins from the current position to provide a time estimate (e.g., a prompt informing the user that the important content begins in five minutes).

In some embodiments, control circuitry 304 may analyze portions of the first media asset a threshold time away from a current position in the first media asset. For example, control circuitry 304 may retrieve a threshold corresponding to an amount of time, frames, etc. to look ahead in a media asset. For example, control circuitry 304 may retrieve a threshold identifying a look ahead time of five minutes (e.g., control circuitry 304 is to look at portions of the media asset five minutes ahead of a current position in a media asset to determine if there is important content at the position). For example, control circuitry 304 may analyze frames of a program stored on a DVR with storage hosted locally or remotely to control circuitry 304. For example, control circuitry 304 may request frames of the media asset from the DVR storage device corresponding to a portion 5 minutes ahead of a current position in the media.

In another example, control circuitry 304 may buffer frames corresponding to a video on demand (VOD) media to enable smooth playback of the VOD media. Control circuitry 304 may analyze frames in the buffer to determine whether upcoming frames in the media asset have important content, as described above. In some embodiments, control circuitry 304 may look ahead a variable amount of time in the media. For example, control circuitry may analyze frames of a buffer corresponding to the media to determine whether frames in the buffer have important content, as described above. As control circuitry 304 detects changes in network load, the buffer of frames available to control circuitry 304 may vary, resultantly, the amount of time that control circuitry 304 looks ahead may vary.

In another example, control circuitry 304 may compute a threshold amount of time to look ahead based on a length of the media asset (e.g., control circuitry 304 may look ahead for five minutes for a two hour long media asset but may look ahead for two minutes for a 30 minute long media asset.

In another example, control circuitry 304 may utilize a broadcast delay to determine whether important content corresponds to an upcoming segment. For example, control circuitry 304 may determine that a live media asset has a broadcast delay of seven seconds. Control circuitry 304 may utilize the broadcast delay to retrieve metadata corresponding to content seven seconds ahead of a current position in the media asset; or may retrieve frames corresponding to the broadcast delay and may perform an image processing algorithm on the frames to determine whether they contain important content, as described above.

In some embodiments, control circuitry 304 may receive a third input (e.g., via user input interface 310) of a third selection of at least one of the first and the second media asset. For example, following the illustrative example prompt 602, in response to detecting selection of change button 606 (e.g., by detecting the input via user input interface 310), control circuitry 304 may generate for display the second media asset in full-screen mode (i.e., replacing the first media asset in full-screen mode) because the user wants to proceed with viewing the second media asset despite the notification that important content on the first media asset will be missed. In response to detecting selection of cancel button 610, control circuitry 304 may generate for display the second media asset in a window mode overlaying the first media asset so that the user does not miss the important content or content of the second media asset.

In some embodiments, control circuitry 304 may identify a location of a prompt based on a location of the important content. For example, control circuitry 304 may perform image analysis on a frame corresponding to the important portion (as described above) to identify important content in the frame. Control circuitry 304 may identify pixel data corresponding to the important content to identify a location of the important content relative to the pixels of the full-screen mode (e.g., by performing the image processing techniques as described above or by receiving metadata listing coordinates of important content). Based on identifying the pixels, control circuitry 304 may identify an area of the display screen having important content, such as important content area 608.

Control circuitry 304 may use the important content area (e.g., important content area 608) as a boundary for where a message or a window should never block (e.g., because then the user may miss the important content). Control circuitry 304 may use an image-tracking algorithm to trace a path taken by content deemed to be important by control circuitry 304 and may update the important content area accordingly. For example, control circuitry 304 may identify a football in a football game as an important content type (e.g., because the football may be near an end zone and there may be a higher chance of a team scoring a touchdown) using methods described above. Control circuitry 304 may identify a location of the football on the screen and may subsequently trace the path of the football using an image-tracking algorithm or using metadata identifying a location of the football on the screen (e.g., display 312). In an example, if the football traverses the screen from left to right in a sequence of 10 frames, control circuitry 304 may update the important content area (e.g., important content area 608) for each frame of the 10 frames such that the important content area tracks the football from the left side to the screen to the right side of the screen.

In some embodiments, in response to updating the important content area, control circuitry 304 may update a location of a window or a prompt to avoid the important content area. For example, control circuitry 304 may store a location of a window or a prompt, such as prompt 602, in memory. Control circuitry may compare the location of the prompt with the location of the important content area (e.g., important content area 608) to determine whether there is overlap. In response to detecting overlap (e.g., by comparing the locations of the pixels of the message or prompt with the location of the pixels of the important content area), control circuitry 304 may generate for display the prompt or the window in a different area of the display screen (e.g., on display 312) such that the windows no longer overlap.

For example, control circuitry 304 may store four coordinates (e.g., pixel locations) corresponding to a rectangle about the window or prompt and four coordinates corresponding to the important content area. Control circuitry 304 may linearly interpolate lines between each of the four coordinates to identify the rectangle about the message or prompt and the rectangle about the important area. Control circuitry 304 may compare the points of the interpolations to determine if lines of a first rectangle bisect lines of a second rectangle. If control circuitry 304 determines that the lines bisect, control circuitry 304 determines that the window or prompt covers important content.

Figure 7:
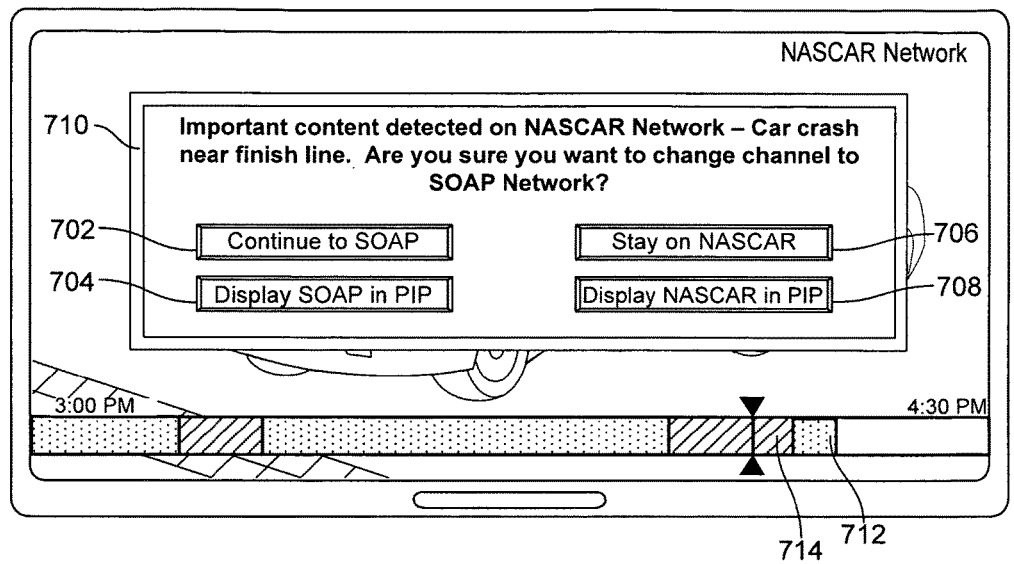
FIG. 7 shows an illustrative example of a prompt to request a user action in response to detecting important content in accordance with some embodiments of the disclosure.

FIG. 7 shows an illustrative example of a prompt generated by control circuitry 304 to request a user action in response to detecting important content in accordance with some embodiments of the disclosure. User equipment 700 is depicted having a detailed confirmation prompt, such as detailed prompt 710. Detailed prompt 710 may comprise buttons such as continue button 702, stay button 706, PIP button 704 and swap PIP button 708. Additionally, user equipment 700 is depicted having a progress bar with indications such as buffered important portion 714 and unviewed buffered portion 712. In some embodiments, control circuitry 304 may generate for display some or all elements of FIG. 7 for display on a display device, such as display 312.

In some embodiments, in response to determining that the portion comprises important content, control circuitry 304 may generate for display detailed prompt 710. Control circuitry 304 may generate for display detailed prompt 710, like prompt 602, to inform the user about important content in the first media asset and to confirm selection of the second media asset having knowledge of the important content. Control circuitry 304 may generate for display detailed prompt 710 to enable to present to the user further options to optimize viewing experience of the media having important content.

For example, control circuitry 304 may generate for display a button such as continue button 702. Control circuitry 304 may detect selection of a button, such as continue button 702, stay button 706, PIP button 704 or swap PIP button 708, (e.g., by detecting a infrared pulse at an infrared detector at user input interface 310 or by detecting touch-screen input selecting one of the buttons). Control circuitry 304 may correlate the infrared pulse or touch-screen selection (e.g., received via user input interface 310) with a location on the screen (e.g., display 312). Control circuitry 304 may compare the location on the screen with the location of the buttons to identify a button of the buttons corresponding to the input. This is just an exemplary method for preventing blocking of important content, other methods for preventing blocking of important content may be used.

In some embodiments, control circuitry 304 may buffer at least one of the first and the second media asset in response to the prompt. For example, control circuitry 304 may determine that a prompt, such as detailed prompt 710, cannot be generated for display by control circuitry 304 without blocking the important content of the first media asset (e.g., based on interpolating points corresponding to the important content and points corresponding to the prompt as described above). Control circuitry 304 may 'pause' the first media asset at the second time and may store frames of at least one of the first and the second media asset. For example, control circuitry 304 may store frames of a media asset at a point when the prompt is generated for display by control circuitry 304, or control circuitry 304 may store frames of a media asset at a point when control circuitry 304 receives the second selection. For example, control circuitry 304 may store the frames, so that control circuitry 304 can generate for display the frames at a time later than the second selection (e.g., so that important content is not missed by the user while control circuitry 304 is awaiting input from the user, the frames may be missed). For example, control circuitry 304 may generate for display the prompt at 4:00 PM. Control circuitry 304 may buffer frames of the first and of the second media asset after 4:00 PM until the prompt is cleared. In response to detecting selection of the first media asset (e.g., via user input interface 310) using control circuitry 304, control circuitry 304 may generate for display (e.g., on display 312) the buffered frames corresponding to the first media asset (e.g., the frames of the first media asset corresponding to a position in the first media asset at 4:00 PM, when the prompt was generated for display). In response to detecting selection of the second media asset (e.g., via user input interface 310) using control circuitry 304, control circuitry 304 may generate for display the buffered frames corresponding to the second media asset (e.g., the frames of the second media asset corresponding to a position in the second media asset at 4:00 PM, when the prompt was generated for display).

In some embodiments, control circuitry may buffer portions of important content and of non-important content of the first media asset. Control circuitry 304 may depict a visual representation of the portion of buffered important frames in a progress bar (e.g., buffered important portion 714) having a different visual representation than non-important buffered frames, such as unviewed buffered portion 712.

In some embodiments, control circuitry 304 may detect a user input request to generate for display the second media asset in response to generating for display the detailed prompt (e.g., via user input interface 310). For example, control circuitry 304 may detect selection of a button to confirm selection of the second media asset, such as a selection of continue button 702. In response to detecting selection of continue button 702, control circuitry 304 may generate for display the second media asset in the full-screen mode (e.g., a media asset on SOAP Network because, for example, the user may not care about the important content detected by control circuitry 304).

In some embodiments, control circuitry 304 may generate for display the second asset a time corresponding to the second selection. For example, control circuitry 304 may buffer packets of the second media asset after control circuitry 304 detects the second selection (e.g., the selection which causes the prompt to be generated for display). Control circuitry 304 may generate for display the second media asset at the point beginning with the frames in the buffer.

In some embodiments, control circuitry 304 may detect a user input request to generate for display the first media asset in response to generating for display the detailed prompt (e.g., via user input interface 310). For example, control circuitry 304 may detect selection of a button to cancel or delay selection of the second media asset, such as a selection of stay button 706. In response to detecting selection stay button 706, control circuitry 304 may generate for display the first media asset in the full-screen mode.

In some embodiments, control circuitry 304 may generate for display the first media asset in the full-screen mode until the important portion is detected by control circuitry 304 as completed. For example, control circuitry 304 may determine that the first media asset has an important portion spanning the times of 4:20 PM to 4:25 PM. If control circuitry 304 detects user selection of the second media asset at 4:22 PM control circuitry 304 may generate for display, in the full-screen mode, the first media asset without generating for display the second media asset (e.g., to block display of the second media asset). Control circuitry 304 may generate for display the second media asset when control circuitry 304 determines that there is no longer important content in the first media asset (e.g., after 4:25 PM).

In some embodiments, control circuitry 304 may generate for display a prompt confirming display of the second media asset once the first media asset no longer has important content. For example, control circuitry 304 may prompt the user to confirm whether control circuitry 304 should generate for display the second media asset after the first media asset no longer is detected by control circuitry 304 to have important content.

In some embodiments, control circuitry 304 may buffer portions of the second media asset when display of the second media asset is blocked by control circuitry 304. For example, control circuitry 304 may store in a buffer a set of frames corresponding to the second media asset from a time when a selection of the second media asset takes place (e.g., 4:22 PM) control circuitry 304 may generate for display the second media asset at a point corresponding to the frames in the buffer (e.g., so that the user does not miss out on content of the second media asset).

In some embodiments, control circuitry 304 may detect a user input request (e.g., via user input interface 310) to generate for display the second media asset in a partial screen window overlaid over content being displayed, such as the first media asset e.g. For example, control circuitry 304 may detect selection of a button such as PIP button 704. Control circuitry 304 may generate for display the second media asset in a partial screen window overlying content being displayed, such as the first media asset, in response to the selection. Display of the partial screen window of the second media asset is discussed further in detail in relation to FIG. 8.

In some embodiments, control circuitry 304 may detect a user input request to generate for display the first media asset in a partial screen window overlying content being displayed, such as the second media asset (e.g., via user input interface 310). For example, control circuitry 304 may detect selection of a button such as PIP button 704. Control circuitry 304 may generate for display the first media asset in a partial screen window overlaying the second media asset in response to the selection. Display of the partial screen window of the first media asset is discussed further in detail in relation to FIG. 14.

Figure 8:
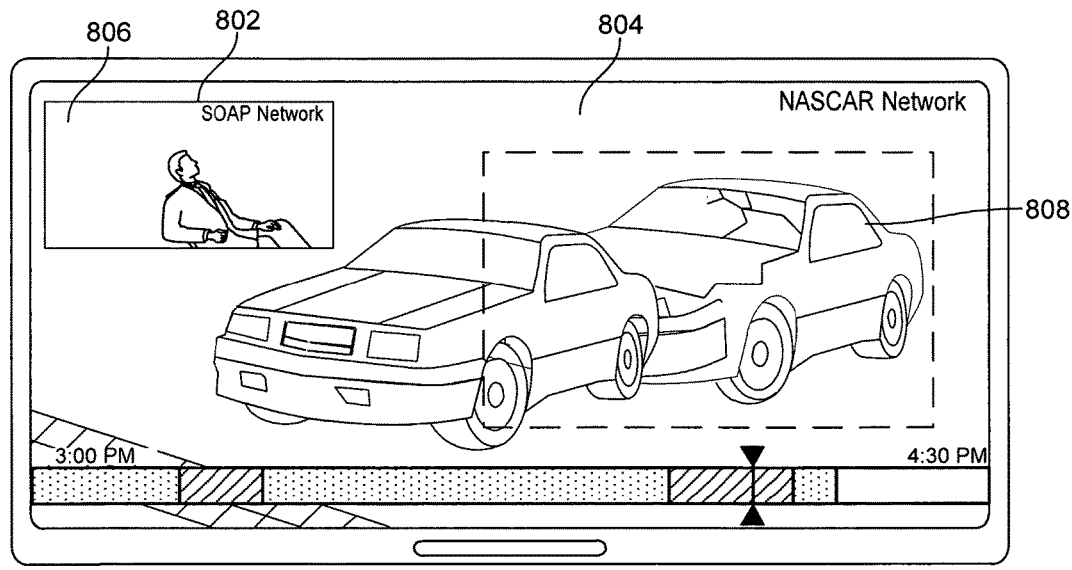
FIG. 8 shows an illustrative example of a first media asset generated for display in a full-screen mode and a second media asset generated for display in a window mode in accordance with some embodiments of the disclosure.

FIG. 8 shows an illustrative example of a first media asset generated for display in a full-screen mode and a second media asset generated for display in a partial screen window in accordance with some embodiments of the disclosure. User equipment 800 is depicted having first media asset 804 generated for display (e.g., by control circuitry 304) in a full-screen mode of the display (e.g., display 312) and second media asset 806 is depicted in a partial screen window 802 overlaid over first media asset 804. Important content 808 is depicted in an important content window (e.g., important content area 608) of the display.

In some embodiments, in response to determining that the portion of the first media asset generated for display in the full-screen mode is important, control circuitry 304 may generate for display (e.g., for display on display 312) the second media asset in a partial screen window, wherein the second media asset in the partial screen window overlays the first media asset in the full-screen mode. Control circuitry 304 may determine that the portion of the first media asset is important by, for example, performing image processing on the first media asset and detecting content in a frame corresponding to the portion. For example, if the first media asset is a NASCAR race, the media guidance application may analyze the first media asset and determine that there has been a car crash (e.g., based on comparing a fingerprint generated for a frame corresponding to the portion to a database of image fingerprints stored locally or remote from control circuitry 304, such as storage 308 or media guidance data source 418 and determining that the fingerprint of the frame matches a fingerprint of a car crash).

Control circuitry 304 may identify that the car crash is important content because, for example, control circuitry 304 may retrieve data indicating that users are concerned about drivers during a crash and find it important to see if the driver is okay. In response to detecting that the first media asset has important content, control circuitry may generate the second media asset for display in a partial screen window, partially overlaid over content being displayed, such as the first media asset displayed in the full-screen mode. Control circuitry 304 may generate the second media asset for display in the partial screen window so that the user does not miss out on the important content detected in the first media asset and so that the user may also consume the second media asset in accordance with the selection.

In some embodiments, control circuitry 304 may prevent generating for display the second media asset in the partial screen window until the user confirms the second selection. For example, control circuitry may generate a prompt, such as prompt 602 and detailed prompt 710. In response to receiving user selection confirming selection of the second media asset (e.g., via user input interface 310), control circuitry 304 may generate for display the second media asset in the partial screen window overlaying content being displayed, such as the first media asset.

Figure 9:
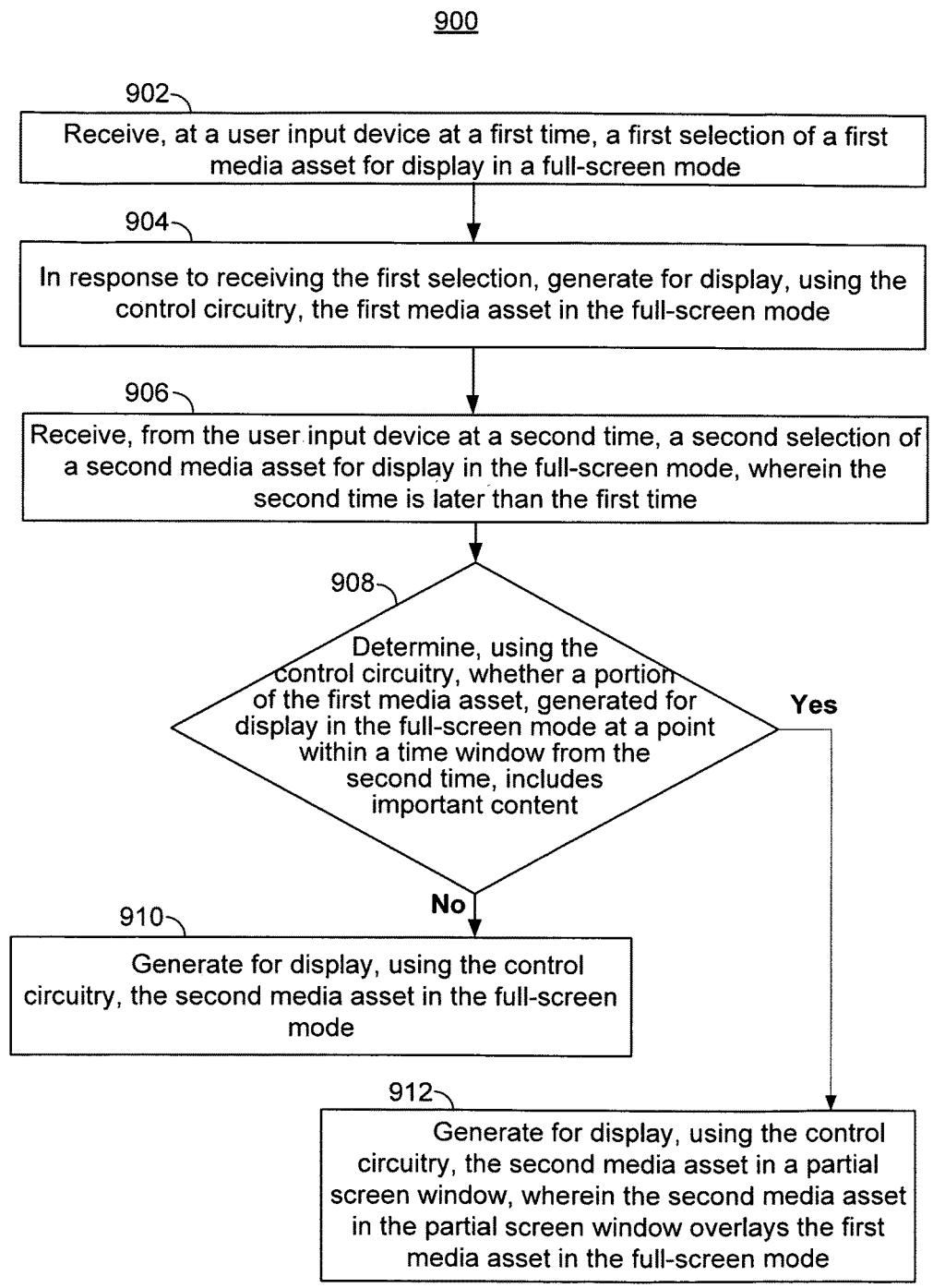
FIG. 9 is a flow-chart of illustrative steps for enhancing viewing of a media asset having important content in accordance with some embodiments of the disclosure.

FIG. 9 depicts a flow-chart of illustrative steps for enhancing viewing a first media asset having important content such as first media asset 804. It should be noted that process 900, or any step thereof, could be performed on, or provided by, any of the devices shown in FIGS. 3-4. For example, process 900 may be executed by control circuitry 304 as instructed by a media guidance application implemented on user equipment 402, 404, 406 in order to enhance viewing the first media asset. In addition, one or more steps of process 900 may be incorporated into or combined with one or more steps of any other process or embodiment (e.g., process 1000 and 1200).

At step 902, control circuitry 304 receives, at a user input device at a first time, a first selection of a first media asset for display in a full-screen mode. For example, control circuitry 304 may receive, via user input interface 310, touch-screen input corresponding to selection of a first media asset, such as a NASCAR race. Control circuitry 304 may correlate the input with a first time, such as a system time corresponding to receiving the input.

At step 904, in response to receiving the first selection, control circuitry 304 generates for display the first media asset in the full-screen mode. For example control circuitry 304 may retrieve a display size (e.g., a size in pixels) from a display device accessible to control circuitry 304, such as display 312. Control circuitry 304 may generate for display the first media asset such that it comprises all pixels of the display device, based on the size.

At step 906, control circuitry 304 receives, from the user input device at a second time, a second selection of a second media asset for display in the full-screen mode, wherein the second time is later than the first time. For example, control circuitry 304 may receive, at user input interface 310, user input from a Radio Frequency ("RF") remote controller. Control circuitry 304 may identify a command sent via the RF remote controller selecting a second media asset. Control circuitry 304 may correlate the second selection with a second time (e.g., a system time when the user input was received by the second media asset).

At step 908, control circuitry 304 determines whether a portion of the first media asset generated for display in the full-screen mode at a point within a time window from the second time includes important content. For example, control circuitry 304 may identify a portion of the first media asset corresponding to a time window from the second time. For example, control circuitry 304 may retrieve a threshold time from memory, such as storage 308, and may add the threshold time to the second time to create an upper boundary on the time window. Control circuitry 304 may subtract the threshold from the second time to create a lower boundary on the window. Control circuitry 304 may identify the portion as the frames of the first media asset matching the times in the time window. Control circuitry 304 may retrieve metadata corresponding to the first media asset and, based on the metadata, control circuitry 304 may determine if the portion has important content using any of the methods described above. Alternatively, control circuitry 304 may determine if the portion has important content by performing an image processing algorithm on the frames to detect whether there is important content in the portion using any of the methods described above.

At step 910, in response to determining that the portion of the first media asset generated for display in the full-screen mode does not include important content, control circuitry 304 generates for display the second media asset in the full-screen mode. For example, control circuitry 304 may generate for display (e.g., for display on display 312) the second media asset such that it takes up the full size of the display (e.g., so that the first media asset is no longer generated or displayed).

At step 912, in response to determining that the portion of the first media asset generated for display in the full-screen mode includes important content, control circuitry 304 generates for display the second media asset in a partial screen window, wherein the partial screen window overlays the first media asset in the full-screen mode. For example, control circuitry 304 may generate for display (e.g., for display on display 312) a partial screen window overlaying content being displayed, such as the first media asset, such that the partial screen window is smaller than the size of the display. Furthermore, control circuitry 304 may generate for display the second media asset in a position in the display (e.g., display 312) such that the partial screen window does not block the important content of the first media asset as described above.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
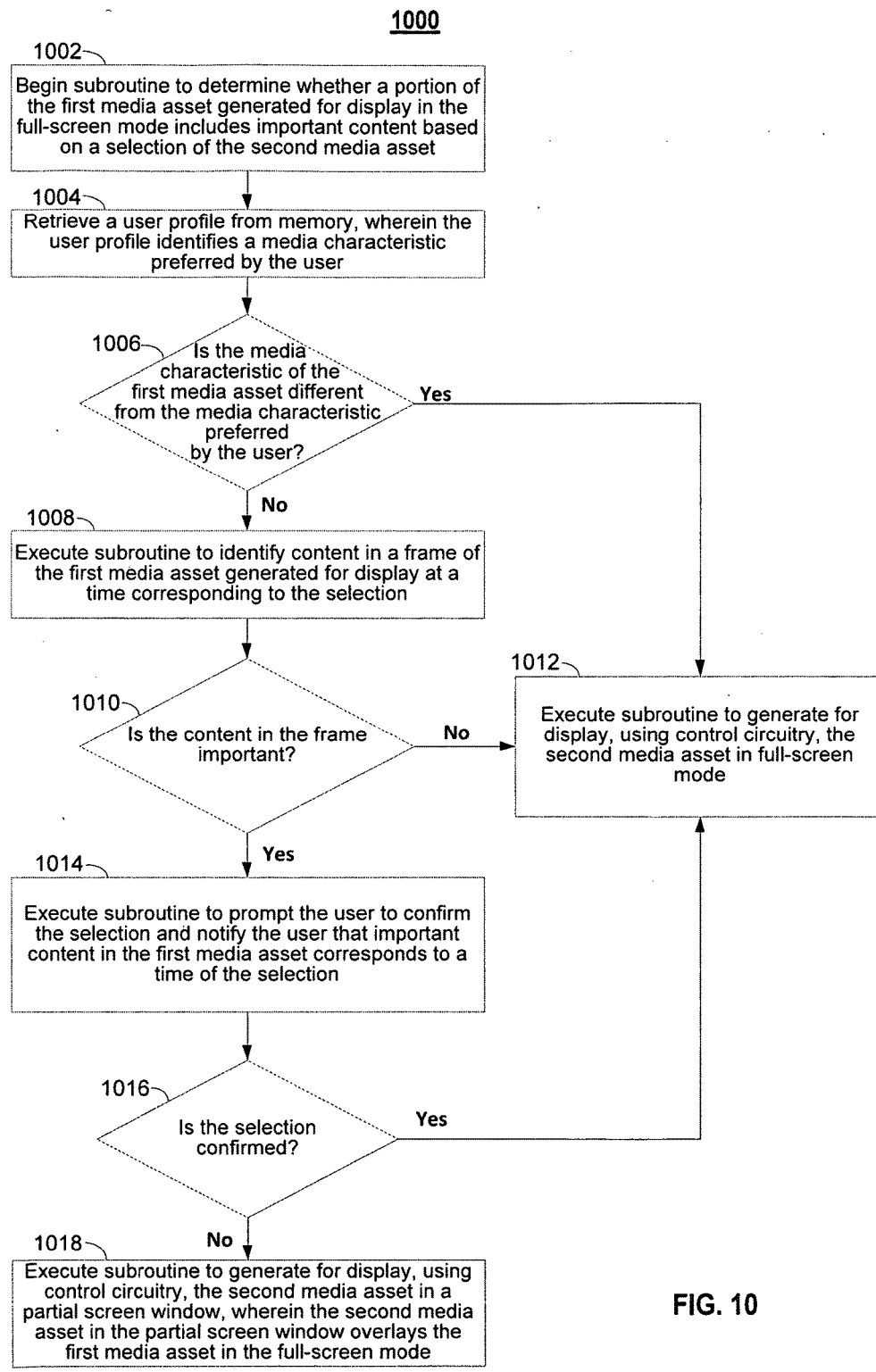
FIG. 10 is a flow-chart of illustrative steps for determining whether to generate for display a second media asset in full-screen mode based on content recognized in a first media asset in accordance with some embodiments of the disclosure.

FIG. 10 depicts a flow-chart of illustrative steps for determining whether to change display of a first media asset in full-screen mode to a second media asset. It should be noted that process 1000, or any step thereof, could be performed on, or provided by, any of the devices shown in FIGS. 3-4. For example, process 1000 may be executed by control circuitry 304 as instructed by a media guidance application implemented on user equipment 402, 404, 406 in order to enhance viewing the first media asset. In particular, the process in FIG. 10 may be performed in conjunction with step 908 of FIG. 9 for determining whether a portion of the first media asset generated for display in the full-screen mode at a point within a time window from the second time includes important content. In addition, one or more steps of process 1000 may be incorporated into or combined with one or more steps of any other process or embodiment (e.g., process 900 and 1200).

At step 1002, control circuitry 304 begins a subroutine to determine whether a portion of the first media asset generated for display in full-screen mode includes important content based on a selection of the second media asset. In some embodiments, this may be done either directly or indirectly in response to a user action or input (e.g., from signals received by control circuitry 304 or user input interface 310). For example, the subroutine may begin directly in response to control circuitry 304 receiving signals from user input interface 310, or control circuitry 304 may prompt the user to confirm their input using a display (e.g., by generating a prompt to be displayed on display 312) prior to running the subroutine.

At step 1004, control circuitry retrieves a user profile from memory, wherein the user profile identifies a media characteristic preferred by the user. For example, control circuitry 304 may retrieve a user profile corresponding to a user by accessing a user profile stored locally to control circuitry 304 (e.g., on storage 308) or remote to control circuitry 304 on media guidance data source 418 in accordance with the methods described above. Control circuitry 304 may analyze the user profile to identify a media characteristic preferred by the user, such as data stored by the user indicating a preference for sporting events.

At step 1006, control circuitry 304 determines whether a media characteristic of the first media asset is different from the media characteristic preferred by the user. For example, control circuitry 304 may identify a media characteristic of the first media asset based on metadata received by control circuitry 304. For example, control circuitry 304 may detect that the first media asset is a sporting event based on the metadata. Control circuitry 304 may compare the media characteristic of the first media asset (e.g., sporting event) to the media characteristic of interest to the user (e.g., sports). If control circuitry 304 determines that there is a match, control circuitry 304 proceeds to step 1012 (e.g., to determine if the portion has important sports content); if control circuitry 304 determines that there is not a match, control circuitry 304 proceeds to step 1008 (e.g., because the user may have a user profile setting to only notify the user of important content for sport media).

At step 1008, control circuitry 304 executes a subroutine to identify content in a frame of the first media asset generated for display at a time corresponding to the selection. For example, control circuitry 304 may identify a portion within a window as described above. Control circuitry 304 may select a frame from the portion for the identifying by, for example, selecting a frame corresponding to the beginning of the portion, or by selecting a frame matching the time of the selection.

At step 1010, control circuitry 304 determines whether content in the frame is important. For example, control circuitry 304 may retrieve metadata corresponding to the first media asset and, based on the metadata, control circuitry 304 may determine if the portion has important content using any of the methods described above. Alternatively, control circuitry 304 may determine if the portion has important content by performing an image processing algorithm on the frames to detect whether there is important content in the portion using any of the methods described above. If control circuitry 304 determines that the frame comprises important content, control circuitry 304 proceeds to step 1014. If control circuitry 304 determines that the frame does not comprise important content, control circuitry 304 proceeds to step 1012.

At step 1012, control circuitry 304 executes a subroutine to generate for display the second media asset in full-screen mode. For example, control circuitry 304 may identify a size of a display, such as a size of display 312, and may generate for display the second media asset such a that the size of the second media asset generated for display matches the size of the display.

At step 1014, control circuitry 304 executes a subroutine to prompt the user to confirm the selection and notify the user that the important content in the first media asset corresponds to a time of the selection. For example, control circuitry 304 may generate for display a prompt, such as prompt 602 or detailed prompt 710. Control circuitry 304 may await user confirmation of the second selection of the second media asset (e.g., by awaiting user input on user input interface 310). In response to determining that the user confirms the second selection of the second media asset (e.g., the user wants to display the second media asset in full-screen instead of the first media asset), control circuitry 304 proceeds to step 1012. In response to determining that the user does not confirm selection of the second media asset (e.g., the user wants to display the first media asset in full-screen), control circuitry 304 proceeds to step 1018.

At step 1018, control circuitry 304 executes a subroutine to generate for display the second media asset in a partial screen window, wherein the partial screen window overlays the first media asset in the full-screen mode. For example, control circuitry 304 may generate for display (e.g., for display on display 312) a partial screen window overlaying the first media asset such that the partial screen window is smaller than the size of the display. Furthermore, control circuitry 304 may generate for display the second media asset in a position in the display (e.g., display 312) such that the partial screen window does not block the important content of the first media asset as described above.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

FIG. 11 described pseudocode to determine whether a portion of the first media asset generated for display in the full-screen mode includes important content based on a selection of the second media asset in accordance with some embodiments of the disclosure. It will be evident to one skilled in the art that the process described by the pseudocode in FIG. 11 may be implemented in any number of programming languages and a variety of different hardware, and that the style and format should not be construed as limiting, but rather a general template of the steps and procedures that would be consistent with code used to implement some embodiments of this disclosure.

At line 1101, control circuitry 304 runs a subroutine to initialize variables and prepare to receive a user profile from memory, which begins on line 1105. For example, in some embodiments, control circuitry 304 may copy instructions from non-transitory storage medium (e.g., storage 308) into RAM or into a cache for processing circuitry 306 during the initialization stage.

At line 1105, control circuitry 304 receives a user profile from memory, wherein the user profile identifies a media characteristic preferred by the user. For example, control circuitry 304 may access the user profile from local memory, such as storage 308, by retrieving a pointer to an array or a user profile class identifying a location of the stored user profile in the memory. In another example, control circuitry may receive the user profile from remote storage, such as media guidance data source 418. Control circuitry may download the user profile from the media guidance data source 418 via communications network 414 and may store the user profile in local memory (e.g., storage 308) to enhance the performance of the algorithm.

At line 1107, control circuitry 304 stores a value of a media characteristic of the first media asset in temporary variable A. In some embodiments, the value of variable A may be retrieved through an accessor method for retrieving the media characteristic of the first media asset.

At line 1108, control circuitry 304 stores a value of a media characteristic preferred by the user in temporary variable B. In some embodiments, the value of variable B may be retrieved through an accessor method for retrieving the media characteristic of interest to the user stored in memory. In some embodiments, control circuitry 304 may execute a subroutine for determining a media characteristic of interest to the user in accordance with some embodiments of the disclosure.

At line 1109, control circuitry 304 stores a time of the selection of the second media asset in temporary variable C. In some embodiments, control circuitry 304 may associate a time of the selection of the second media asset with a real time (e.g., 4:00 PM) generated by accessing a real time clock (RTC) of processing circuitry 306. In some embodiments, control circuitry 304 may associate the time of the selection with a local time, such as a time in ticks of a counter of processing circuitry 306. Control circuitry 304 may store the time in temporary variable C.

At line 1110 control circuitry 304 stores a frame of the first media asset corresponding to time C. In some embodiments, control circuitry 304 may execute a subroutine to capture a frame of the first media asset at time C (i.e., the time of the selection of the second media asset). In some embodiments, control circuitry 304 may execute a subroutine to compare the time in variable C to a timeline of the first media asset. Control circuitry 304 may select a frame in the first media asset matching time C.

At line 1112, control circuitry 304 compares variable A to variable B to determine whether the stored values are not equal. For example, control circuitry 304 may execute a subroutine to compare the two variables (i.e., because a direct comparison cannot be performed on non-primitive types). If the comparison is true, control circuitry proceeds to line 1113; if the comparison is false, control circuitry proceeds to line 1115.

At line 1113, control circuitry 304 executes a subroutine to generate for display the second media asset in full-screen mode. For example, control circuitry 304 may communicate with a display device accessible to control circuitry 304 such as display 312. Control circuitry 304 may identify a size of the display (e.g., by querying the display for a size or by accessing in memory, such as storage 308, a size of the display) and may scale the second media asset to comprise a size of the display.

At line 1115, control circuitry 304 executes a subroutine to identify content in a frame of the first media asset, for example, control circuitry 304 may execute an image processing subroutine to identify content in the first media asset and may store an identification of the content in memory, such as storage 308.

At line 1116, control circuitry 304 determines whether the content is important. For example, control circuitry may compare the identified content to a set of data that identifies of important content types stored in a data structure in memory, such as storage 308. If control circuitry 304 determines that the identified content matches a content type of the set of important content types, then control circuitry 304 may determine that the content is important. If control circuitry 304 determines that the identified content does not matches a content type of the set of important content types, then control circuitry 304 may determine that the content is not important. If control circuitry 304 determines that the content is important, control circuitry 304 proceeds to line 1117. If control circuitry 304 determines that the content is not important, control circuitry 304 proceeds to line 1123.

At line 1117, control circuitry 304 executes a subroutine to prompt the user to confirm selection and to notify the user that an important content in the first media asset corresponds to the time of the selection. For example, control circuitry 304 may generate for display a prompt such as prompt 602 or detailed prompt 710 prompting the user for a confirmation. Control circuitry 304 may wait for user input confirming the selection via user input interface 310. Control circuitry 304 may buffer frames of at least one of the first and the second media asset while control circuitry 304 is waiting for user input.

At line 1118, control circuitry determines whether the user confirmed the selection in the prompt. For example, control circuitry 304 may receive input at input interface 310. Control circuitry 304 may correlate the input with a button on one of prompt. 602 or detailed prompt 710. In response to determining that the input corresponds to a confirmation button, such as button change button 606, control circuitry will proceed to line 1119. In response to determining that the input corresponds to a button not confirming the selection, such as cancel button 610, control circuitry 304 will proceed to line 1121.

At line 1119, control circuitry 304 will execute a subroutine to generate for display the second media asset in the full-screen mode as discussed in relation to line 1113.

At line 1121, control circuitry 304 executes a subroutine to generate for display the second media asset in a window, wherein the window overlays the first media asset in the full-screen mode. For example, control circuitry 304 may generate for display (e.g., for display on display 312) a partial screen window overlaying content being displayed, such as the first media asset such that the partial screen window is smaller than the size of the display. Furthermore, control circuitry 304 may generate for display the second media asset in a position in the display (e.g., display 312) such that the partial screen window does not block the important content of the first media asset as described above. Subsequently, control circuitry 304 will proceed to line 1125.

At line 1123, control circuitry 304 will execute a subroutine to generate for display the second media asset in the full-screen mode as discussed in relation to line 1113 and line 1119.

At line 1125, control circuitry 304 will execute a termination subroutine. For example, in some embodiments control circuitry 304 may destruct variables, perform garbage collection, free memory or clear the cache of processing circuitry 306.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 12:
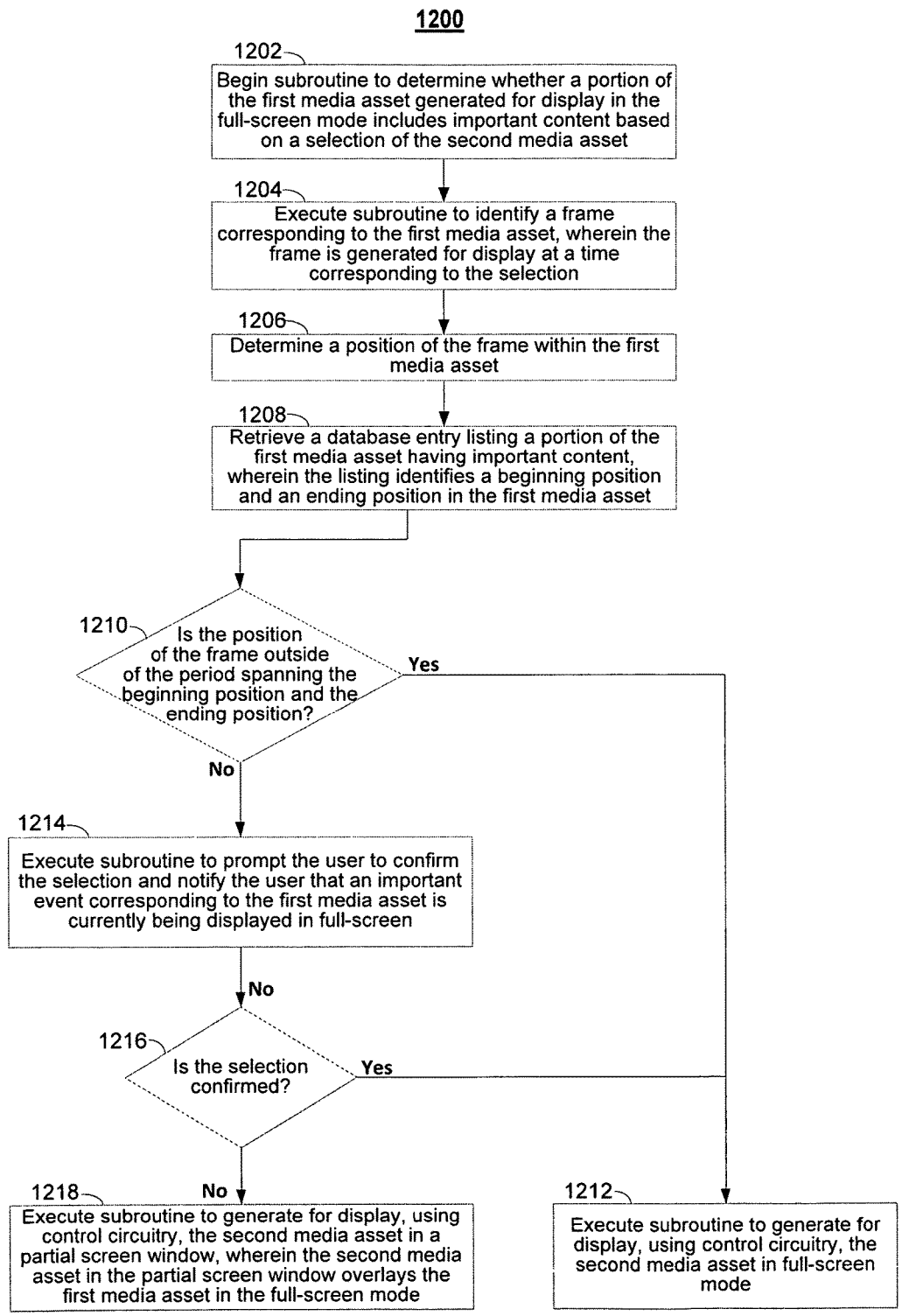
FIG. 12 is a flow-chart of illustrative steps for determining whether to generate for display a second media asset in full-screen mode based on a position of a frame of a first media asset in accordance with some embodiments of the disclosure.

FIG. 12 depicts a flow-chart of illustrative steps for determining whether to change display of a first media asset in full-screen mode to a second media asset. It should be noted that process 1200, or any step thereof, could be performed on, or provided by, any of the devices shown in FIGS. 3-4. For example, process 1000 may be executed by control circuitry 304 as instructed by a media guidance application implemented on user equipment 402, 404, 406 in order to enhance viewing the first media asset. In particular, the process in FIG. 10 may be performed in conjunction with step 908 of FIG. 9 for determining whether a portion of the first media asset generated for display in the full-screen mode at a point within a time window from the second time includes important content. In addition, one or more steps of process 1200 may be incorporated into or combined with one or more steps of any other process or embodiment (e.g., process 900 and 1000).

At step 1202, control circuitry 304 begins a subroutine to determine whether a portion of the first media asset generated for display in the full-screen mode includes important content based on a selection of the second media asset. In some embodiments, this may be done either directly or indirectly in response to a user action or input (e.g., from signals received by control circuitry 304 or user input interface 310). For example, the subroutine may begin directly in response to control circuitry 304 receiving signals from user input interface 310, or control circuitry 304 may prompt the user to confirm their input using a display (e.g., by generating a prompt to be displayed on display 312) prior to running the subroutine.

At step 1204, control circuitry 304 executes a subroutine to identify a frame corresponding to the first media asset, wherein the frame is generated for display at a time corresponding to the selection. For example, control circuitry 304 may identify a time window, as described above, and may correlate the time window with the first media asset. Control circuitry 304 may select a frame of a plurality of frames of the first media asset matching the window by, for example, selecting the first frame in the window, or by selecting the last frame in the window.

At step 1206, control circuitry 304 determines a position of the frame within the media asset. For example, the media guidance application may determine a position of the frame in a sequence of frames corresponding to the first media asset by, for example, identifying a frame number associated with the frame, wherein the frame number corresponds to a position.

At step 1208, control circuitry 304 retrieves a database entry listing a portion of the first media asset having important content, wherein the listing identifies a beginning position and an ending position in the first media asset. For example, control circuitry 304 may retrieve metadata corresponding to the first media asset. For example, control circuitry 304 may receive a JSON datagram and may detect an array of values representing a first position in the first media asset and a second position in the first media asset. Control circuitry 304 may identify the first position as delimiting a beginning of an important portion and may identify the second position as delimiting an ending of an important portion.

At step 1210, control circuitry 304 determines whether the position of the frame is outside of the period spanning the beginning position and the ending position. For example, control circuitry 304 may compare the position of the frame to the first position and the second position to determine if the position is both greater than the first position and less than the second position. If false, control circuitry 304 proceeds to step 1212; if true, control circuitry proceeds to step 1214.

At step 1212, control circuitry 304 executes a subroutine to generate for display the second media asset in full-screen mode. For example, control circuitry 304 may communicate with a display device accessible to control circuitry 304 such as display 312. Control circuitry 304 may identify a size of the display (e.g., by querying the display for a size or by accessing in memory, such as storage 308, a size of the display) and may scale the second media asset to comprise a size of the display.

At step 1214, control circuitry 304 executes a subroutine to prompt the user to confirm the selection and notify the user that an important event corresponding to the first media asset is currently being displayed in full-screen. For example, control circuitry 304 may generate for display a prompt, such as prompt 602 or detailed prompt 710. Control circuitry 304 may await user confirmation of the selection of the second media asset (e.g., by awaiting user input on user input interface 310).

At step 1216 control circuitry confirms whether the selection is confirmed. In response to determining that the user confirms selection of the second media asset (e.g., the user wants to display the second media asset in full-screen instead of the first media asset), control circuitry 304 proceeds to step 1212. In response to determining that the user does not confirm selection of the second media asset (e.g., the user wants to display the first media asset in full-screen), control circuitry 304 proceeds to step 1218.

At step 1218, control circuitry 304 executes a subroutine to generate for display the second media asset in a partial screen window, wherein the partial screen window overlays content being displayed, such as the first media asset in the full-screen mode. For example, control circuitry 304 may generate for display (e.g., for display on display 312) a partial screen window overlaying the first media asset such that the partial screen window is smaller than the size of the display. Furthermore, control circuitry 304 may generate for display the second media asset in a position in the display (e.g., display 312) such that the window does not block the important content of the first media asset as described above.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 12.

FIG. 13 describes pseudocode to determine whether a portion of the first media asset generated for display in the full-screen mode includes important content based on a selection of the second media asset in accordance with some embodiments of the disclosure. It will be evident to one skilled in the art that the process described by the pseudocode in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1301, control circuitry 304 runs a subroutine to initialize variables and prepare to receive a user profile from memory, which begins on line 1105. For example, in some embodiments, control circuitry 304 may copy instructions from non-transitory storage medium (e.g., storage 308) into RAM or into a cache for processing circuitry 306 during the initialization stage.

At line 1305, control circuitry 304 executes a subroutine to identify a frame corresponding to the first media asset, wherein the frame is generated for display, by control circuitry, at a time corresponding to the selection. For example, control circuitry 304 may identify a frame of the first media asset that is located within the time window as described above.

At line 1306, control circuitry 304 determines a position of the frame within the first media asset. For example, control circuitry 304 may identify a time relative to the first media asset for the frame. Control circuitry may use the time to identify a position within the first media asset by, for example, determining how far the time is in the first media asset (e.g., 30 minutes is a halfway point for a 1-hour movie).

At line 1307, control circuitry 304 retrieves a database entry listing a portion of the first media asset having important content. For example, control circuitry 304 may receive from media guidance data source 418 via communications network 414 the database entry. Control circuitry 304 may identify the portion of the first media asset having the important content based on the database entry as described above.

At line 1310, control circuitry 304 sets a temporary value A to a determined value of a position of the frame within the first media asset. Control circuitry 304 may identify a position of the frame within the first media asset as described above.

At line 1311, control circuitry 304 sets a temporary value B to a beginning position within the first media asset of the important content. Control circuitry 304 may parse a database entry to identify a beginning position as the first frame of the portion of the first media asset identified by the database entry as having important content.

At line 1312, control circuitry 304 sets a temporary value C to an ending position within the first media asset of the important content. Control circuitry 304 may parse a database entry to identify an ending position as the last frame of the portion of the first media asset identified by the database entry as having important content.

At line 1315, control circuitry 304 compares the value of A to the values of B and C to determine if the position of the frame is within the positions delimiting the important content. For example, control circuitry may retrieve the values of each of variable A, B, and C from memory (e.g., storage 308) and may compare the values to determine if A is within the span of B and C. In response to determining that A is not within the span of B and C, control circuitry 304 proceeds to line 1316. In response to determining that A is within the span of B and C, control circuitry 304 proceeds to line 1319.

At line 1316, control circuitry 304 executes a subroutine to generate for display the second media asset in full-screen mode. For example, control circuitry 304 may communicate with a display device accessible to control circuitry 304 such as display 312. Control circuitry 304 may identify a size of the display (e.g., by querying the display for a size or by accessing in memory, such as storage 308, a size of the display) and may scale the second media asset to comprise a size of the display.

At line 1318, control circuitry 304 executes a subroutine to prompt the user to confirm the selection. For example, control circuitry 304 may generate for display a prompt such as prompt 602 or detailed prompt 710 prompting the user for a confirmation. Control circuitry 304 may wait for user input confirming the selection via user input interface 310.

At line 1319, control circuitry determines whether the user confirmed the selection in the prompt. For example, control circuitry 304 may receive input at input interface 310. Control circuitry 304 may correlate the input with a button on one of prompt 602 or detailed prompt 710. In response to determining that the input corresponds to a confirmation button, such as button change button 606, control circuitry will proceed to line 1119. In response to determining that the input corresponds to a button not confirming the selection, such as cancel button 610, control circuitry 304 will proceed to line 1121.

At line 1320, control circuitry 304 will execute a subroutine to generate for display the second media asset in the full-screen mode as discussed in relation to line 1316.

At line 1322, control circuitry 304 executes a subroutine to generate for display the second media asset in a partial screen window, wherein the partial screen window overlays content being displayed, such as the first media asset in the full-screen mode. For example, control circuitry 304 may generate for display (e.g., for display on display 312) a window overlaying the first media asset such that the partial screen window is smaller than the size of the display. Furthermore, control circuitry 304 may generate for display the second media asset in a position in the display (e.g., display 312) such that the window does not block the important content of the first media asset as described above. Subsequently, control circuitry 304 will proceed to line 1324.

At line 1324, control circuitry 304 will execute a termination subroutine. For example, in some embodiments control circuitry 304 may destruct variables, perform garbage collection, free memory or clear the cache of processing circuitry 306.

It will be evident to one skilled in the art that process 1300 described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 14:
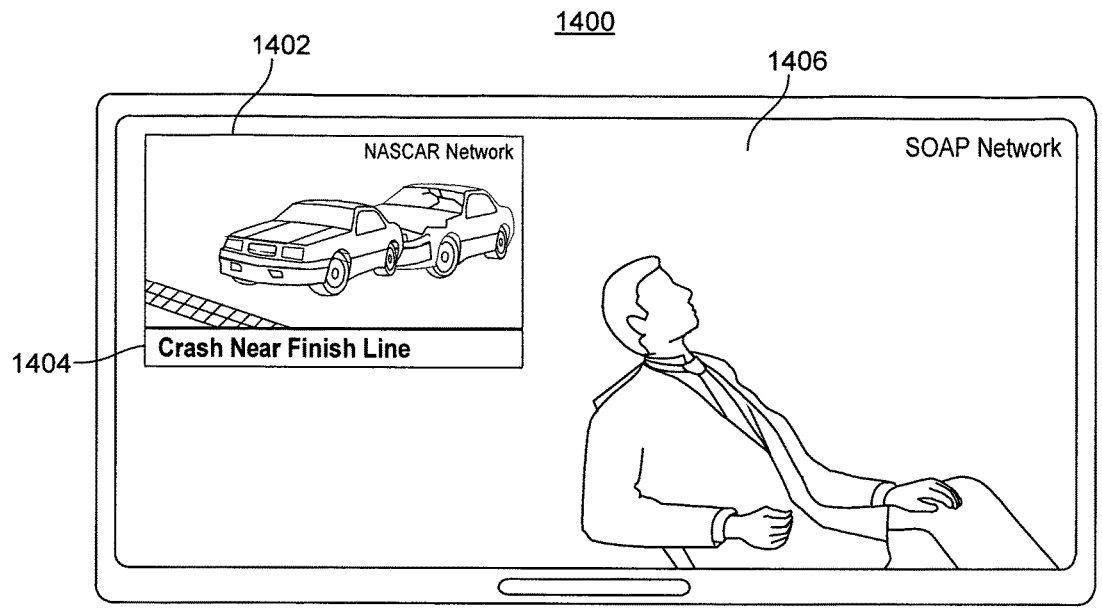
FIG. 14 shows an illustrative example of a first media asset generated for display in a window mode having a description of important content in accordance with some embodiments of the disclosure.

FIG. 14 shows an illustrative example of a first media asset generated for display in a window mode having a description of important content in accordance with some embodiments of the disclosure. User equipment 1400 is depicted having a display, such as display 312 having a second media asset in full-screen mode 1406, having a first media asset in a window 1402 and having an important content description 1404.

In some embodiments, control circuitry 304 may receive from a user input device, such as user input device 310, a third selection of the second media asset for display in the full-screen mode. For example, the media guidance application may detect a user selection to render the first media asset in a partial screen window. For example, control circuitry 304 may detect selection of a button, such as swap PIP button 708, requesting swapping the first media asset from full-screen mode to a partial screen window.

In some embodiments, control circuitry 304 may generate sound (e.g., for output on speakers 314) corresponding to the first media asset, while the first media asset is generated for display in the partial screen window overlying the second media asset generated for display in the full-screen window. When control circuitry 304 determines that the first media asset no longer has important content, as described above, control circuitry 304 may generate for sound for output on speakers 314 corresponding to the second media asset (e.g., replacing the sound corresponding to the first media asset).

In some embodiments, in response to determining that a second portion of the first media asset does not include important content (e.g., a portion following a portion having important content), control circuitry 304 may generate for display the second media asset in the full-screen mode as described above. In some embodiments, control circuitry 304 may generate for display the first media asset in the window (e.g., first media asset in a window 1402). For example, control circuitry 304 may replace a media asset generated for display in the window, such as the second media asset, with the first media asset and may instead generate for display the second media asset full-screen (e.g., second media asset in full-screen mode 1406). In some embodiments, control circuitry 304 generates for display the second media asset in the full-screen mode, replacing the first media asset in the full-screen mode, in response to determining that the second portion of the first media asset does not have important content.

In some embodiments, control circuitry 304 may access data describing important content corresponding to the frame, wherein the data provides a textual description of the important content in the frame. For example, control circuitry 304 may receive metadata corresponding to the first media asset which describes the important content. In an example, the control circuitry 304 may identify a sports score as the important content. Control circuitry may receive metadata comprising the sports score. In another example, control circuitry 304 may perform image processing on a frame of the first media asset to identify a description of the important content. Following the example where the important content is a sports score, the media guidance application may process a frame of the first media asset to identify a scoreboard within the frame. Control circuitry 304 may process the image to generate a string based on text recognized in the scoreboard (e.g., a string having the score on the scoreboard generated using an OCR algorithm).

In some embodiments, control circuitry 304 may generate for display the textual description of the important content wherein the textual description overlays the second media asset in the full-screen mode. For example, control circuitry 304 may generate for display on a display screen, such as display 312, a string of characters representing the description of the important content, such as important content description 1404.

In some embodiments, control circuitry 304 may generate for display a graphical indicator of the important content. For example, control circuitry 304 may determine that there are bases loaded within the first media asset (e.g., the important content). Control circuitry 304 may generate for display a graphic overlaid on the second media asset in full-screen mode 1406 showing that all the bases are occupied.

In some embodiments, control circuitry 304 may determine, at a third time later than the second time, that first media asset no longer includes important content. For example, control circuitry 304 may determine that a position corresponding to the first media asset at the third time no longer corresponds to a position of the first media asset identified as having important content. In another example, at the third time, control circuitry 304 may perform image processing on a frame of the first media asset corresponding to the third time and may determine that the frame does not comprise important content.

In response to determining that the frame does not contain important content, control circuitry 304 may generate for display the second media asset in the full-screen mode, without an overlay of the second media asset in the window mode. For example, once control circuitry 304 determines that a portion of the first media asset does not have important content, control circuitry may remove the window and instead display the second media asset. In some embodiments, control circuitry 304 may prompt the user to confirm whether the user wants control circuitry 304 to generate for display the second media asset in the full-screen mode. In some embodiments, control circuitry 304 may buffer frames of the second media asset while the first media asset is generated for display in the full screen mode. When control circuitry 304 that the first media asset no longer has important content, control circuitry 304 may generate for display the second media asset from a point beginning with the frames in the buffer.

In some embodiments, control circuitry 304 may store user preferences in a user profile for handling switching to, and detection of important content. For example, control circuitry 304 may store priorities for important content and control circuitry 304 may perform different functions in response to the priorities. For example, control circuitry 304 may determine that a user finds all sports shows having content with either Derek Jeter or Alex Rodriguez as important. Control circuitry 304 may determine that a user prefers Derek Jeter over Alex Rodriguez. If control circuitry 304 determines that a user is going to switch from a first media asset having just Derek Jeter to a second media asset just having Alex Rodriguez, control circuitry 304 may block display of the second media asset. In contrast, if the first media asset had Alex Rodriguez and the second media asset had Derek Jeter, control circuitry 304 may generate for display the second media asset in the full-screen window and may generate for display the first media asset in a partial screen window. In another example, control circuitry 304 may detect user preferences to automatically always display either the first or the second media in the partial screen window when important content is detected in the first media asset. In another example, control circuitry 304 may detect a user preference to automatically disregard a selection of a media asset not having important content when a first media asset is detected to have important content.

Figure 15:
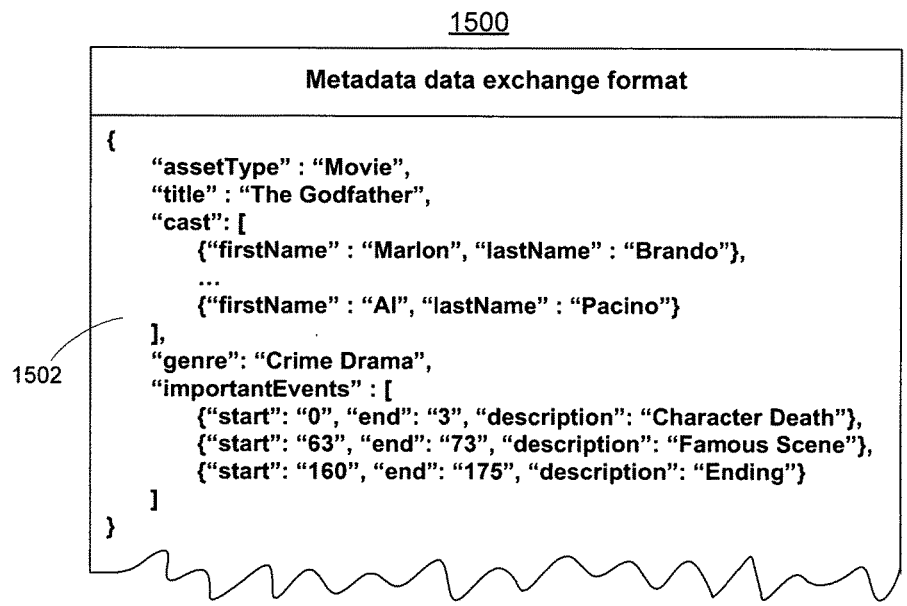
FIG. 15 shows an illustrative example of a metadata exchange format having listings of important events in accordance with some embodiments of the disclosure.

FIG. 15 shows an illustrative example of a metadata exchange format in accordance with some embodiments of the disclosure. Data packet 1500 comprises formatted data 1502. Control circuitry 304 may parse formatted data 1502 to identify, for example, a media characteristic of a media asset (e.g., genre) or important portions of the media asset (e.g., stored in the array "importantEvents"). Control circuitry 304 may parse the "importantEvents" array to determine a start position, designated by "start" and an end position, designated by "end" of the important portion. Additionally, control circuitry 304 may identify a description of the important content corresponding to a "description" field. Upon detecting metadata corresponding to the metadata exchange format (e.g., via communications network 414), control circuitry 304 may parse the metadata as described above and may store the parsed metadata in memory, such as storage 308, for use by control circuitry 304 in accordance with any of the methods described above.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. Furthermore, it should be noted that while a first step may be based on and/or in response to a second step, such a relationship does not preclude additional steps occurring between the first and second steps. In addition, the systems and methods described herein may be performed in real time. It should also be noted, the systems and/or methods described above may be applied to, or used in accordance with, other systems and/or methods. The processing described above can be performed on user equipment and also performed at a server in whole or in conjunction with processing performed at the user equipment.

What is claimed is:

1. A method, implemented using control circuitry of a user equipment device, for enhancing the viewing experience of a user, the method comprising:
   receiving, from a user input device at a first time, a first selection of a first media asset for display in a full-screen mode;
   in response to receiving the first selection, generating for display, using the control circuitry, the first media asset in the full-screen mode;
   receiving, from the user input device at a second time, a second selection of a second media asset for display in the full-screen mode, wherein the second time is later than the first time;
   in response to receiving the second selection, determining, using the control circuitry, whether a portion of the first media asset, at a point within a time window from the second time, includes important content;
   in response to determining that the portion of the first media asset generated for display in the full-screen mode is not important, generating for display, using the control circuitry, the second media asset in the full-screen mode; and
   in response to determining that the portion of the first media asset generated for display in the full-screen mode is important, generating for display, using the control circuitry, the second media asset in a partial screen window, wherein the second media asset in the partial screen window overlays the first media asset in the full-screen mode.

2. The method of claim 1, wherein determining whether the portion of the first media asset includes important content comprises:
   receiving metadata corresponding to the first media asset, wherein the metadata identifies content corresponding to the portion;
   retrieving, from a database, a set of data that identifies important content types;
   comparing, using the control circuitry, the content corresponding to the portion to the set of important content types to determine whether the content corresponding to the portion matches an important content type from the set;

determining that the portion of the first media asset includes important content when the content corresponding to the first media asset matches the important content type from the set; and determining that the portion of the first media asset does not include important content when the content corresponding to the first media asset does not match the important content type from the set.

3. The method of claim 1, wherein determining whether the portion of the first media asset includes important content comprises:

receiving metadata corresponding to the first media asset, wherein the metadata identifies an important portion of the first media asset, wherein a beginning of the important portion is delimited by a first position in the first media asset, and wherein an ending of the important portion is delimited by a second position in the first media asset, later than the first position;

identifying a third position in the first media asset corresponding to the second time;

comparing the third position to the first and the second position to determine whether the third position is within the important portion;

determining that the portion of the first media asset includes important content when third position is within the important portion; and determining that the portion of the first media asset does not include important content when the third position is not within the important portion.

4. The method of claim 1, wherein determining whether the portion of the first media asset includes important content comprises:

retrieving a frame of the first media asset generated for display in the full-screen mode at the point within the time window of the second selection;

analyzing the frame to determine whether a characteristic of the frame matches an image processing rule;

determining that the portion of the first media asset includes important content when the characteristic of the frame matches the image processing rule; and determining that the portion of the first media asset does not include important content when the characteristic of the frame does not match the image processing rule.

5. The method of claim 1, wherein determining whether the portion of the first media asset includes important content comprises:

retrieving a user profile from memory;

identifying a preference from the user profile, wherein the preference identifies a media characteristic of interest to the user;

retrieving metadata corresponding to the first media asset, wherein the metadata comprises a set of media characteristics corresponding to the first media asset;

determining whether the media characteristic of interest to the user matches a media characteristic of the set of media characteristics;

determining that the portion of the first media asset includes important content when the media characteristic of interest to the user matches the media characteristic of the set of media characteristics; and determining that the portion of the first media asset does not include important content when the media characteristic of interest to the user does not match the media characteristic of the set of media characteristics.

6. The method of claim 1, wherein the important content corresponds to at least one of a player in a user's fantasy sports roster, a scene corresponding to high social chatter, and gameplay in a sports event having a high probability of scoring.

7. The method of claim 1, further comprising:

retrieving a frame of the first media corresponding to the portion;

accessing data describing important content corresponding to the frame, wherein the data provides a textual description of important content in the frame; and generating for display, using the control circuitry, the textual description of the important content, based on the data, wherein the textual description overlays a media asset in the full-screen mode.

8. The method of claim 1, further comprising:

determining, at a third time later than the second time, that a second portion of the first media asset at the third time, does not include important content; and in response to determining that the second portion of the first media asset does not include important content, generating for display, using the control circuitry, the second media asset in the full-screen mode, without an overlay of the second media asset in the partial screen window.

9. The method of claim 1, further comprising:

prompting the user, within the time window from the second time, that the portion of the first media asset is important; and in response to the prompting, receiving, from the user input device a third selection of the second media asset for display in the window.

10. The method of claim 1, wherein the image processing rules correspond to one of detecting fast action within the frame, identifying text matching a predefined string, and identifying an object having significance to the user.

11. A system, for enhancing the viewing experience of a user, the system comprising:

input circuitry configured to:
receive, at a first time, a first selection of a first media asset for display in a full-screen mode; and
receive, at a second time, a second selection of a second media asset for display in the full-screen mode, wherein the second time is later than the first time; and control circuitry configured to:
in response to receiving the first selection at the input circuitry, generate for display the first media asset in the full-screen mode;
in response to receiving the second selection at the input circuitry, determine whether a portion of the first media asset, at a point within a time window from the second time, includes important content;
in response to determining that the portion of the first media asset generated for display in the full-screen mode is not important, generate for display, using the control circuitry, the second media asset in the full-screen mode; and
in response to determining that the portion of the first media asset generated for display in the full-screen mode is important, generate for display, using the control circuitry, the second media asset in a partial screen window, wherein the second media asset in the partial screen window overlays the first media asset in the full-screen mode.

12. The system of claim 11, wherein the control circuitry configured to determine whether the portion of the first media asset includes important content is further configured to:
  receive metadata corresponding to the first media asset, wherein the metadata identifies content corresponding to the portion;
  retrieve, from a database, a set of data that identifies important content types;
  compare the content corresponding to the portion to the set of important content types to determine whether the content corresponding to the portion matches an important content type from the set;
  determine that the portion of the first media asset includes important content when the content corresponding to the first media asset matches the important content type from the set; and
  determine that the portion of the first media asset does not include important content when the content corresponding to the first media asset does not match the important content type from the set.

13. The system of claim 11, wherein the control circuitry configured to determine whether the portion of the first media asset includes important content is further configured to:
  receive metadata corresponding to the first media asset, wherein the metadata identifies an important portion of the first media asset, wherein a beginning of the important portion is delimited by a first position in the first media asset, and wherein an ending of the important portion is delimited by a second position in the first media asset, later than the first position;
  identify a third position in the first media asset corresponding to the second time;
  compare the third position to the first and the second position to determine whether the third position is within the important portion;
  determine that the portion of the first media asset includes important content when third position is within the important portion; and
  determine that the portion of the first media asset does not include important content when the third position is not within the important portion.

14. The system of claim 11, wherein the control circuitry configured to determine whether the portion of the first media asset includes important content is further configured to:
  retrieve a frame of the first media asset generated for display in the full-screen mode at the point within the time window of the second selection;
  analyze the frame to determine whether a characteristic of the frame matches an image processing rule;
  determine that the portion of the first media asset includes important content when the characteristic of the frame matches the image processing rule; and
  determine that the portion of the first media asset does not include important content when the characteristic of the frame does not match the image processing rule.

15. The system of claim 11, wherein determining whether the portion of the first media asset includes important content comprises:
  retrieve a user profile from memory;
  identify a preference from the user profile, wherein the preference identifies a media characteristic of interest to the user;
  retrieve metadata corresponding to the first media asset, wherein the metadata comprises a set of media characteristics corresponding to the first media asset;
  determine whether the media characteristic of interest to the user matches a media characteristic of the set of media characteristics;
  determine that the portion of the first media asset includes important content when the media characteristic of interest to the user matches the media characteristic of the set of media characteristics; and
  determine that the portion of the first media asset does not include important content when the media characteristic of interest to the user does not match the media characteristic of the set of media characteristics.

16. The system of claim 11, wherein the important content corresponds to at least one of a player in a user's fantasy sports roster, a scene corresponding to high social chatter, and gameplay in a sports event having a high probability of scoring.

17. The system of claim 11, wherein the control circuitry is further configured to:
  retrieve a frame of the first media corresponding to the portion;
  access data describing important content corresponding to the frame, wherein the data provides a textual description of important content in the frame; and
  generate for display the textual description of the important content, based on the data, wherein the textual description overlays a media asset in the full-screen mode.

18. The system of claim 11, wherein the control circuitry is further configured to:
  determine, at a third time later than the second time, that a second portion of the first media asset at the third time, does not include important content; and
  in response to determining that the second portion of the first media asset does not include important content, generate for display, the second media asset in the full-screen mode, without an overlay of the second media asset in the partial screen window.

19. The system of claim 11, wherein:
  the control circuitry is further configured to:
    prompt the user, within the time window from the second time, that the portion of the first media asset is important; and
  the input circuitry is further configured to:
    in response to the prompt, receive, from the user a third selection of the second media asset for display in the window.

20. The system of claim 11, wherein the image processing rules correspond to one of detecting fast action within the frame, identifying text matching a predefined string, and identifying an object having significance to the user.

* * * * *